US012291277B1

United States Patent
Pennington

(10) Patent No.: US 12,291,277 B1
(45) Date of Patent: May 6, 2025

(54) VEHICLE FRAME AND CARGO BAY LINER HAVING A HATCH

(71) Applicant: PennPlastics, LLC, Mishawaka, IN (US)

(72) Inventor: Terry D. Pennington, Mishawaka, IN (US)

(73) Assignee: PennPlastics, LLC, Mishawaka, IN (US)

( * ) Notice: Subject to any disclaimer, the term of this patent is extended or adjusted under 35 U.S.C. 154(b) by 0 days.

(21) Appl. No.: 18/394,142

(22) Filed: Dec. 22, 2023

Related U.S. Application Data

(63) Continuation-in-part of application No. 17/968,173, filed on Oct. 18, 2022, now Pat. No. 12,145,655, which is a continuation of application No. 17/176,623, filed on Feb. 16, 2021, now Pat. No. 11,472,491, which is a continuation-in-part of application No. 16/920,801, filed on Jul. 6, 2020, now Pat. No. 11,447,189, which is a continuation-in-part (Continued)

(51) Int. Cl.
| | |
|---|---|
| *B62D 25/20* | (2006.01) |
| *B32B 15/08* | (2006.01) |
| *B32B 15/14* | (2006.01) |
| *B60R 13/01* | (2006.01) |

(52) U.S. Cl.
CPC .......... *B62D 25/2072* (2013.01); *B32B 15/08* (2013.01); *B32B 15/14* (2013.01); *B32B 2605/003* (2013.01); *B60R 13/011* (2013.01)

(58) Field of Classification Search
CPC ....... B60R 13/01; B60R 13/011; B62D 33/04; B62D 33/046; B62D 29/045; B62D 25/2072
See application file for complete search history.

(56) References Cited

U.S. PATENT DOCUMENTS

| | | |
|---|---|---|
| 3,173,383 A | 3/1965 | Eggert, Jr. |
| 4,275,663 A | 6/1981 | Sivachenko et al. |

(Continued)

FOREIGN PATENT DOCUMENTS

FR  2964919 A1  3/2012

OTHER PUBLICATIONS

Bubble Insulation Radiant Barrier product as offered on Apr. 19, 2017 on website www.ecofoil.com.

(Continued)

*Primary Examiner* — Jason S Morrow
(74) *Attorney, Agent, or Firm* — Krieg DeVault LLP; Daniel Tychonievich

(57) ABSTRACT

A vehicle and liner assembly including for a recreational vehicle. In another embodiment of the invention, a trailer and liner combination, is provided that includes a vehicle having a housing with a front end, a rear end, a top, a bottom, a pair of sidewalls, and a door providing access to a cargo area defined by the housing. A frame assembly is provided wherein, the housing is mounted on and supported by the frame assembly. The cargo area has a floor and walls, and a liner is attached to at least one of the floor or the walls. The liner has a first face including projections extending therefrom that are also attached to a second face. In one embodiment, the liner includes an integral hatch for ease of accessing the underside of the vehicle.

20 Claims, 46 Drawing Sheets

Related U.S. Application Data of application No. 16/252,022, filed on Jan. 18, 2019, now Pat. No. 10,919,580.

(60) Provisional application No. 63/434,977, filed on Dec. 23, 2022, provisional application No. 62/781,700, filed on Dec. 19, 2018, provisional application No. 62/687,957, filed on Jun. 21, 2018, provisional application No. 62/676,053, filed on May 24, 2018, provisional application No. 62/622,643, filed on Jan. 26, 2018.

(56) References Cited

U.S. PATENT DOCUMENTS

| | | | |
|---|---|---|---|
| 5,456,514 A * | 10/1995 | Justice | B60P 7/135 |
| | | | 224/403 |
| 5,470,642 A * | 11/1995 | Egigian | B60R 13/01 |
| | | | 428/56 |
| 5,863,091 A | 1/1999 | Shepherd et al. | |
| 6,023,806 A | 2/2000 | Dumlao et al. | |
| 6,029,962 A | 2/2000 | Shorten | |
| 6,247,745 B1 | 6/2001 | Carroll, III et al. | |
| 6,595,568 B1 * | 7/2003 | Schroeder | B60R 13/013 |
| | | | 296/39.1 |
| 6,908,143 B2 | 6/2005 | Ashmead | |
| 7,661,752 B2 | 2/2010 | Yamazaki | |
| 7,690,158 B2 * | 4/2010 | Kelly | E04B 2/7429 |
| | | | 52/794.1 |
| 8,205,642 B2 | 6/2012 | Straza | |
| 8,835,016 B2 | 9/2014 | Ebnoether | |
| 9,598,120 B2 | 3/2017 | Ishii | |
| 9,579,866 B2 | 5/2017 | Ros et al. | |
| 10,151,072 B2 | 12/2018 | Lewit | |
| 10,632,028 B2 | 4/2020 | Wada | |
| 10,793,201 B1 | 10/2020 | Johnston, VII | |
| 10,933,925 B2 * | 3/2021 | Palmer | B62D 25/20 |
| 2001/0012812 A1 | 8/2001 | Spengler | |
| 2007/0046059 A1 | 3/2007 | Shepherd et al. | |
| 2010/0119768 A1 | 5/2010 | Simon et al. | |
| 2010/0229308 A1 | 9/2010 | Pearce | |
| 2010/0233503 A1 | 9/2010 | Zachman et al. | |
| 2011/0250384 A1 | 10/2011 | Sumi | |
| 2012/0015151 A1 | 1/2012 | Pearce et al. | |
| 2013/0161364 A1 * | 6/2013 | Tirrell | B60R 13/011 |
| | | | 224/492 |
| 2014/0130657 A1 | 5/2014 | Pilpel et al. | |
| 2014/0145467 A1 | 5/2014 | Ellis | |
| 2015/0353138 A1 | 12/2015 | Fenton | |
| 2015/0360734 A1 | 12/2015 | McKinney et al. | |
| 2017/0044769 A1 | 2/2017 | Fritz | |
| 2017/0327310 A1 | 11/2017 | Ebnother et al. | |
| 2017/0334492 A1 | 11/2017 | Schoen | |
| 2017/0341335 A1 | 11/2017 | Zander et al. | |
| 2018/0170449 A1 | 6/2018 | Cox | |
| 2018/0229641 A1 | 8/2018 | Ehrlich | |
| 2019/0077113 A1 | 3/2019 | Koo et al. | |
| 2020/0061980 A1 | 2/2020 | Pearson et al. | |
| 2020/0290685 A1 | 9/2020 | Bullock et al. | |
| 2023/0166798 A1 | 6/2023 | Foran | |
| 2023/0322147 A1 | 10/2023 | Littlefield | |

OTHER PUBLICATIONS

Bubble guard sheet product as offered on Jun. 28, 2017 on website www.rustx.net.

Bubble-Pack Insulation product with date of first availability of Jan. 31, 2007 as Amazon product page.

* cited by examiner

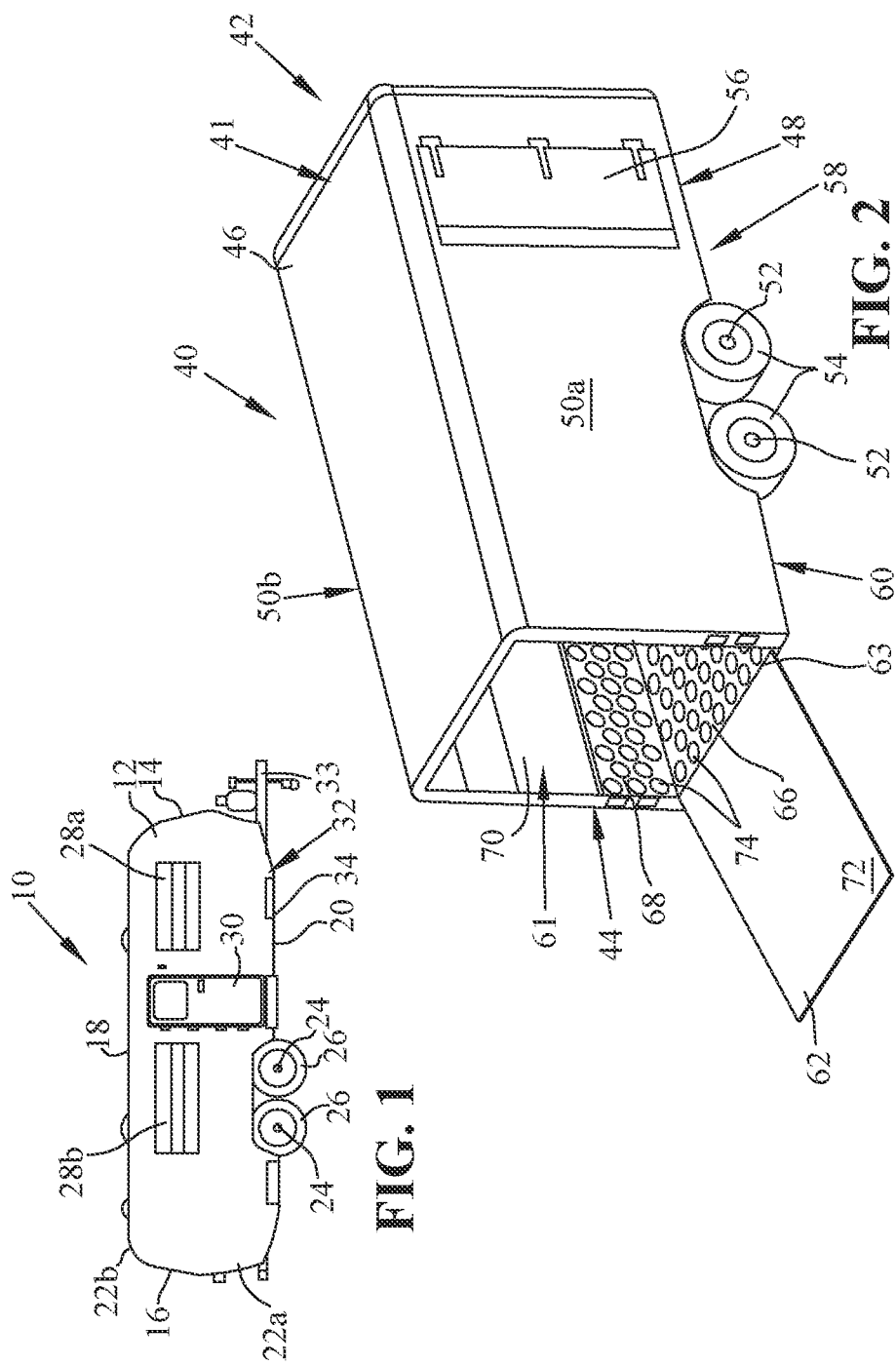

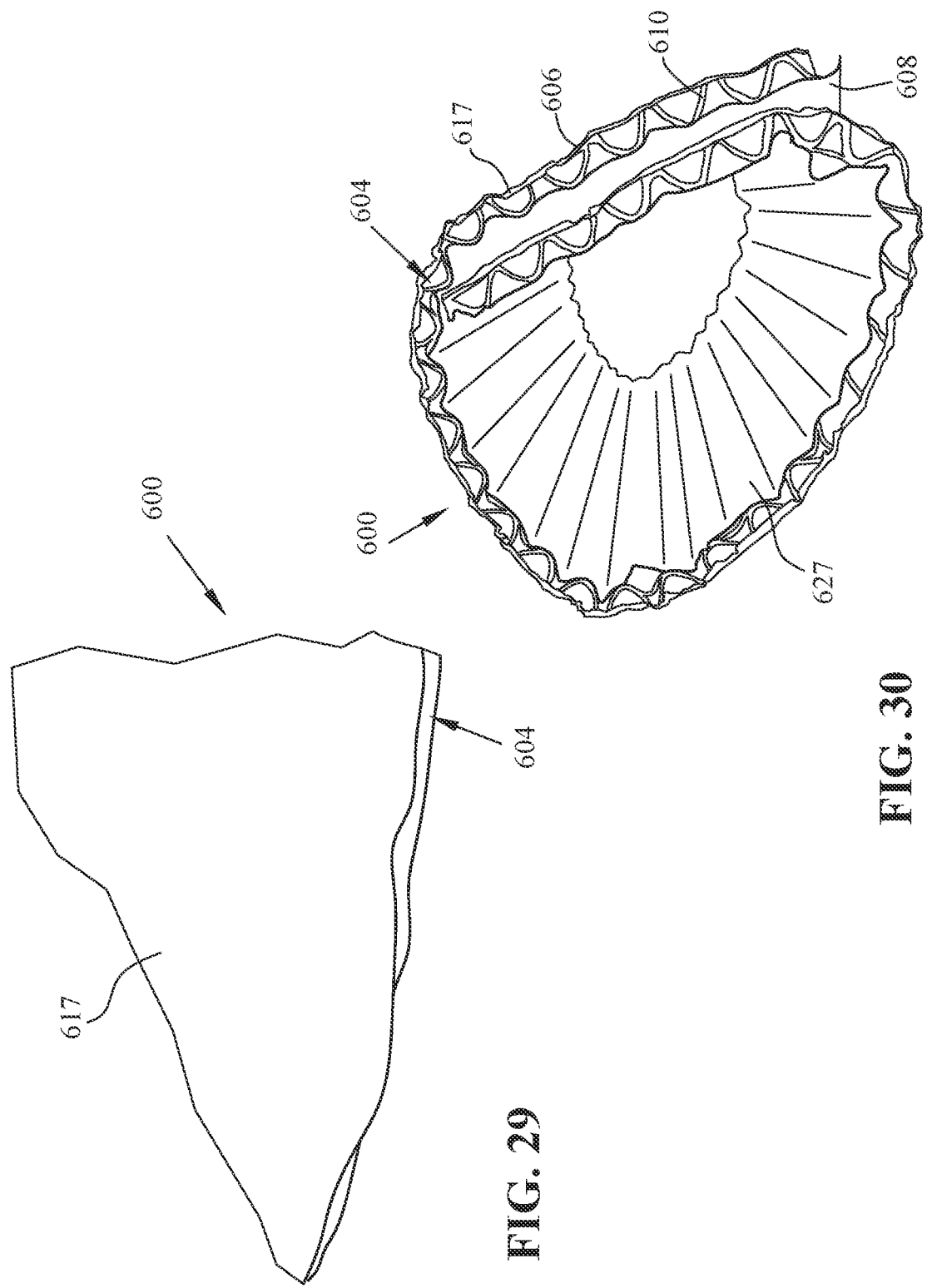

VEHICLE FRAME AND CARGO BAY LINER HAVING A HATCH

The present non-provisional utility patent application claims benefit and priority to U.S. provisional patent application Ser. No. 63/434,977, filed on Dec. 23, 2023; and is a Continuation-In-Part of U.S. nonprovisional patent application Ser. No. 17/968,173 filed on Oct. 18, 2022, which is a Continuation of U.S. Non-provisional utility patent application Ser. No. 17/176,623 filed on Feb. 16, 2021 (now issued as U.S. Pat. No. 11,472,491 on Oct. 18, 2022), which claims priority to and is and is a Continuation-In-Part of U.S. Non-provisional utility patent application Ser. No. 16/920,801 filed on Jul. 6, 2020 (now issued as U.S. Pat. No. 11,447,189 on Sep. 20, 2022), which claims priority to and is a Continuation-In-Part Application to U.S. Non-provisional utility patent application Ser. No. 16/252,022, filed on Jan. 18, 2019 (now issued as U.S. Pat. No. 10,919,580 on Feb. 16, 2021), which claims priority to U.S. Provisional Patent Application No. 62/781,700 filed Dec. 19, 2018, U.S. Provisional Patent Application No. 62/687,957, filed Jun. 21, 2018, U.S. Provisional Patent Application No. 62/676,053, filed May 24, 2018 and U.S. Provisional Patent Application No. 62/622,643, filed Jan. 26, 2018, the entirety of which are incorporated by reference herein

BACKGROUND OF THE INVENTION

This invention relates to a vehicle and liner combination; and in particular to a vehicle and liner combination featuring a unique belly or frame liner and cargo area liner that in one embodiment includes a built in hatch.

In the recreational vehicle (RV) industry, it is common place to apply a liner beneath the frame to protect the underbody of the vehicle and any parts, plumbing, and/or electrical items that may be beneath the floor of the vehicle. Such a liner can also be referred to as a belly liner. Currently known in-use liners are shown in prior art FIGS. 3 and 4. Typically, the liner material is a corrugated plastic (polyethylene) material. The liner material consists of a top sheet, a bottom sheet, and a spacer extending there between. The spacer has a corrugated or sinusoidal configuration to which the top and bottom sheets are mounted (see Prior Art FIG. 3).

SUMMARY OF THE INVENTION

In one embodiment of the invention, a vehicle and liner assembly is provided that includes a recreational vehicle having a housing, a front end, a rear end, a top, a bottom, and a pair of sidewalls. A frame assembly is provided wherein, the housing is mounted on and supported by the frame assembly. The liner is attached to the frame assembly and coves at least a substantial portion of the bottom of the housing. The liner has a first face having projections extending therefrom and a second face having openings therein. The openings coincide with and extend into corresponding projections on the first face.

In another embodiment of the invention, a trailer and liner combination, is provided that includes a vehicle having a housing with a front end, a rear end, a top, a bottom, a pair of sidewalls, and a door providing access to a cargo area defined by the housing. A frame assembly is provided wherein, the housing is mounted on and supported by the frame assembly. The cargo area has a floor and walls, and a liner is attached to at least one of the floor or the walls. The liner has a first face including projections extending therefrom and a second face having openings therein. The openings coinciding with and extend into corresponding projections of the first face. In one embodiment, the liner is mounted to the floor or walls with the first face exposed to the cargo area and the projections extending thereinto.

In still another embodiment of the invention, a vehicle and liner assembly is provided that includes a recreational vehicle having a housing, a front end, a rear end, a top, a bottom, and a pair of sidewalls; a frame assembly, the housing mounted on and supported by the frame assembly; and the liner attached to the frame assembly and covering at least a substantial portion of the bottom of the housing, the liner having a first face with circular dimples and projections extending from an opposite side of the first face and a second face having circular convexities, the convexities coinciding with and extending up corresponding projections on the first face.

The vehicle and liner assembly may include a sheet of aluminum foil or metalized film covering an outer side of one of said first or second face. The foil/film may also cover both faces. The vehicle and liner assembly may also include a sheet of woven or nonwoven fabric adhered to the face of the liner opposite the face having aluminum foil/metalized film thereon. In one embodiment, the aluminum foil/metalized film is adhered to the second face having convexities thereon, and the layer of woven or nonwoven fabric is adhered to the first face having dimples thereon. A layer of woven or nonwoven fabric can also be attached to both the first and second face.

In a another embodiment of the invention, a vehicle and liner assembly is provided that includes a recreational vehicle having a housing, a front end, a rear end, a top, a bottom, and a pair of sidewalls; a frame assembly, the housing mounted on and supported by the frame assembly; a liner attached to the frame assembly and covering at least a substantial portion of the bottom of the housing, the liner having a generally planar first face and a generally planar second face and a corrugated ply extending between the first face and the second face; and a sheet of aluminum foil or metalized film covering an outer side of one of the first face or the second face.

The vehicle and liner assembly may include a second sheet of aluminum foil or metalized film covering an outer side of the other of the first or second face. Alternately, a layer of woven or nonwoven fabric can cover the face of the liner opposite the aluminum foil. Additionally, instead of a having one face covered with aluminum foil, both faces can be covered with a woven or nonwoven layer of fabric.

BRIEF DESCRIPTION OF THE DRAWINGS

The above-mentioned and other features and objects of this invention and the manner of obtaining them will become more apparent, and the invention itself will be better understood by reference to the following description of embodiments of the present invention taken in conjunction with the accompanying figures, wherein:

FIG. 1 is a side view of a recreational vehicle and frame liner in accordance with the subject invention;

FIG. 2 is a perspective view of a cargo trailer and cargo bay liner in accordance with the subject invention;

FIG. 5 is an exploded view of a sandwich material from which one embodiment of the liner for the subject invention is taken from;

FIG. 29 is a perspective view of the vehicle frame and cargo bay liner of FIG. 28;

FIG. 30 is an end view of the vehicle frame and cargo bay liner of FIG. 28 rolled up and showing the aluminum foil on both sides thereof;

Figure 3:
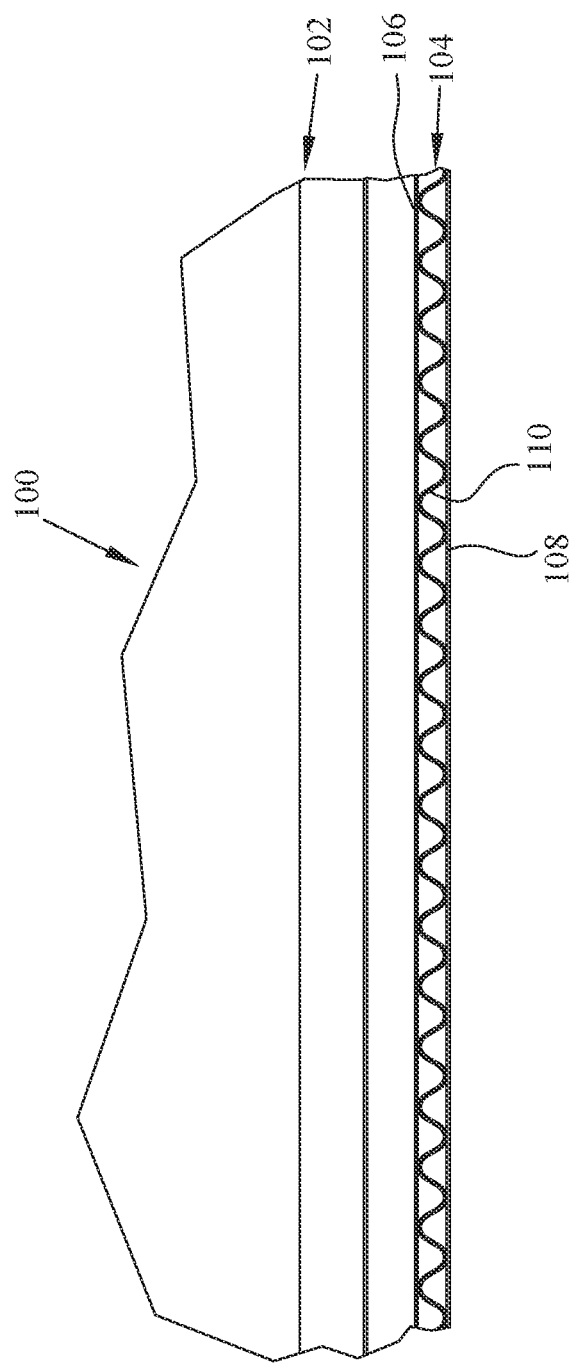
FIG. 3 is a side view of a prior art recreational vehicle frame liner.

Corresponding reference characters indicate corresponding parts throughout the several views. Although the figures represent embodiments of the present invention, the figures are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF EMBODIMENTS OF THE INVENTION

For the purpose of promoting an understanding of the principles of the invention, reference will now be made to the embodiments illustrated in the figures, which are described below. It will nevertheless be understood that no limitation of the scope of the invention is thereby intended. The invention includes any alterations and further modifications in the illustrated devices and described methods and further applications of the principles of the invention, which would normally occur to one skilled in the art to which the invention relates.

Referring now to FIG. 1, a recreational vehicle is shown generally indicated as 10. In the embodiment shown, recreational vehicle 10 is a type commonly called a travel trailer. Travel trailer 10 is generally defined by a housing 12 including a front end 14, a rear end 16, a top 18, a bottom 20, and a pair of generally parallel sides 22a, 22b. Recreational 10 further includes a pair of axels 24 having wheels 26 mounted thereon. Recreational vehicle 10 also includes windows 28a, 28b and a door 30. Housing 14 is mounted upon and supported by a frame assembly, generally indicated as 32, extending into a hitch 33. These are all known and common in the recreational vehicle industry. A liner 34 in accordance with the subject invention is mounted and attached at the bottom of frame assembly 32 to protect the undercarriage of recreational vehicle 10 as described above in the background section.

Now referring to FIG. 2, a trailer of a type normally considered a cargo trailer or toy hauler is shown generally indicated as 40. A toy hauler is generally considered to be a vehicle that has at least a portion or all of the trailer designed as a cargo area or bay to contain and transport another type of vehicle, such as but not limited to motorcycles, ATV's, snowmobiles, or specialty vehicles. Similar to recreational vehicle 10, carbon trailer 40 is defined by a housing, generally indicated as 41. Housing 41 includes a front end 42, a rear end 44, a top 46, a bottom 48, and a pair of generally parallel sides 50a, 50b. Cargo trailer 40 further includes a pair of axels 52 having wheels 54 mounted thereon. Cargo trailer 40 also includes a door 56. Housing 41 is mounted upon and supported by a frame assembly, generally indicated as 58 that extends into a hitch 59. These are all known and common in the cargo trailer and toy hauler industry. Cargo trailer 40 includes a liner 60 in accordance with the subject invention that is mounted and attached at the bottom of frame assembly 58 to protect the undercarriage of cargo trailer 40 similar to recreational vehicle 10.

Cargo trailer 40 also includes a cargo or bay area, generally indicated as 61 which is accessed through a door 62 which swings downward at rear end 44 on a bottom hinge 64. A floor liner 66 in accordance with the subject invention is mounted on top of the floor of cargo area 61 and a similar liner 68 is mounted on walls 70 of cargo area 61. In the embodiment shown, wall liner 68 is mounted partially up wall 70; however, it should be appreciated that the liner could be mounted to extend completely up wall 70. The liner may also be mounted partially or completely on a front wall of cargo area 61 as well on an inside surface 72 of rear door 62. Although not shown to scale, in embodiments shown in FIG. 2, liners 66 and 68 include projections 74 extending from the liner into the cargo area.

Figure 4:
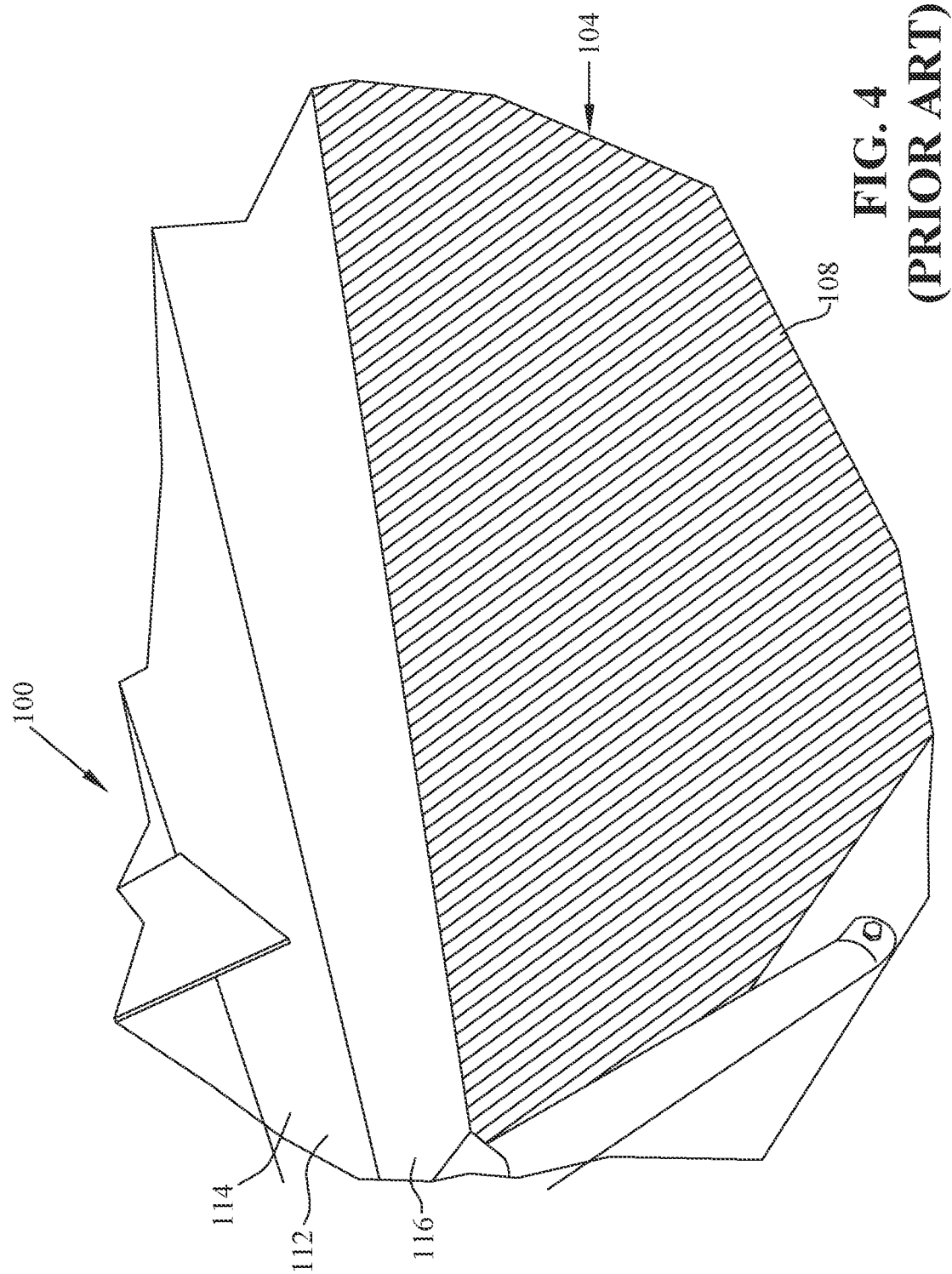
FIG. 4 is a bottom prospective view of a prior art recreational vehicle and frame liner.

Referring now to FIGS. 3 and 4, these depict prior art vehicle undercarriage frame liners in common use in the industry. A portion of a recreational vehicle is generally indicated as 100. Recreational vehicle 100 includes a frame assembly generally indicated as 102 and a corrugated liner generally indicated as 104. Corrugated liner 104 includes a top sheet 106, a bottom sheet 108, and a corrugated or sinusoidal ply 110 extending therebetween. Top sheets 106 and 108 are adhered or attached to corrugated ply 110. Typically, the corrugated material is polyethylene.

Figure 3A:
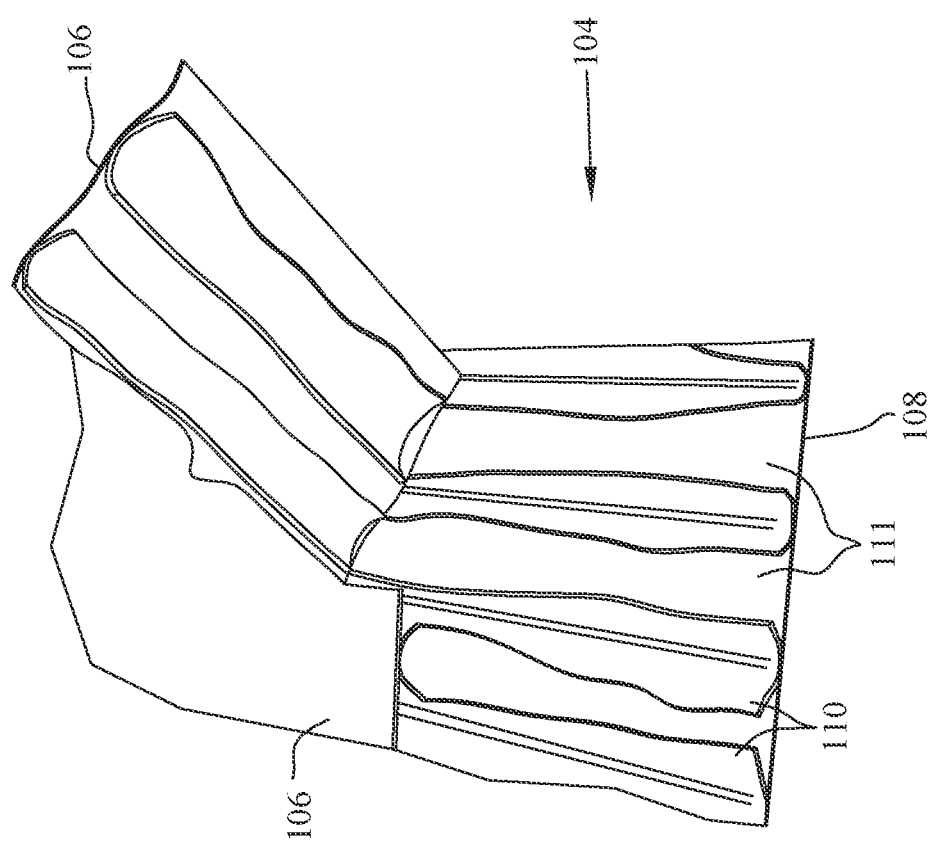
FIG. 3A is an enlarged perspective view of the frame liner in FIG. 3 showing the top layer partially peeled back and channels therein.

Referring to FIG. 3A, a portion of the corrugated liner 104 is shown removed from recreational vehicle 100. In FIG. 3A, a portion of the top sheet 106 has been pulled back revealing channels 111 that extend between top sheet 106 and bottom sheet 108 and along/within the sinusoidal ply 110. As should be appreciated, a problem, with the prior art liner is that any water or moisture entering the open ends of the corrugated liner 104 easily crosses through channels 111 so that channels 111 can become filled with water. The water can leak or freezing of the water may cause ripping, tearing or pulling apart of corrugated liner 104, thereby destroying its structural integrity.

Referring to FIG. 4, only the bottom sheet 108 of corrugated liner 104 is visible. Furthermore, the corrugations are not visible as recreational vehicle 100 includes a frame member 112, such as in I-beam or C-channel including a vertical web 112 and horizontal flange 116. Side edges of corrugated liner 104 are located on top of flange 112.

Figure 5:
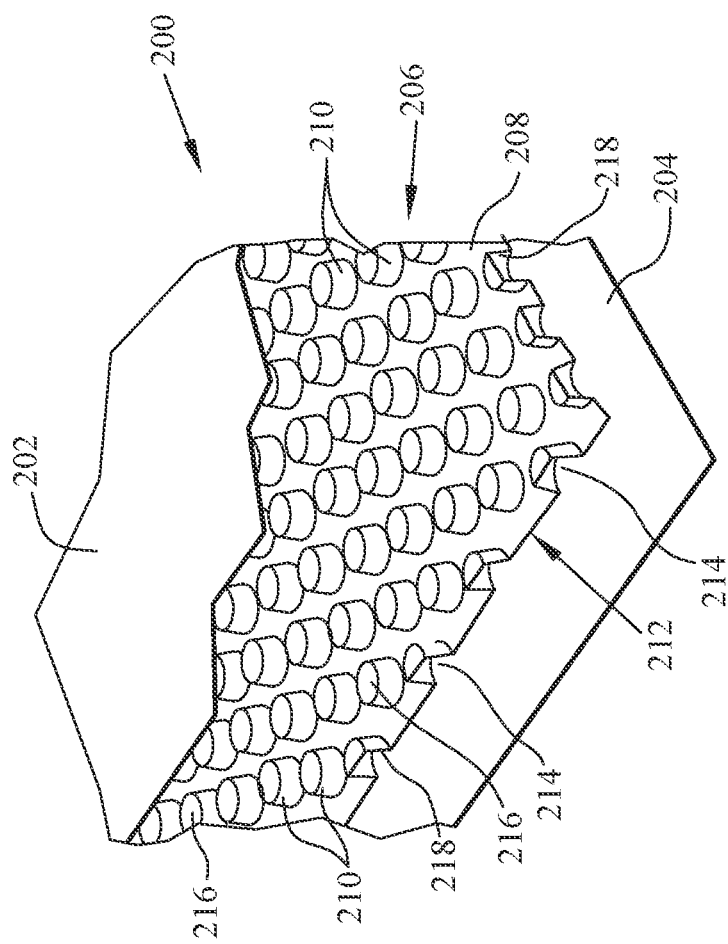
Figure 6:
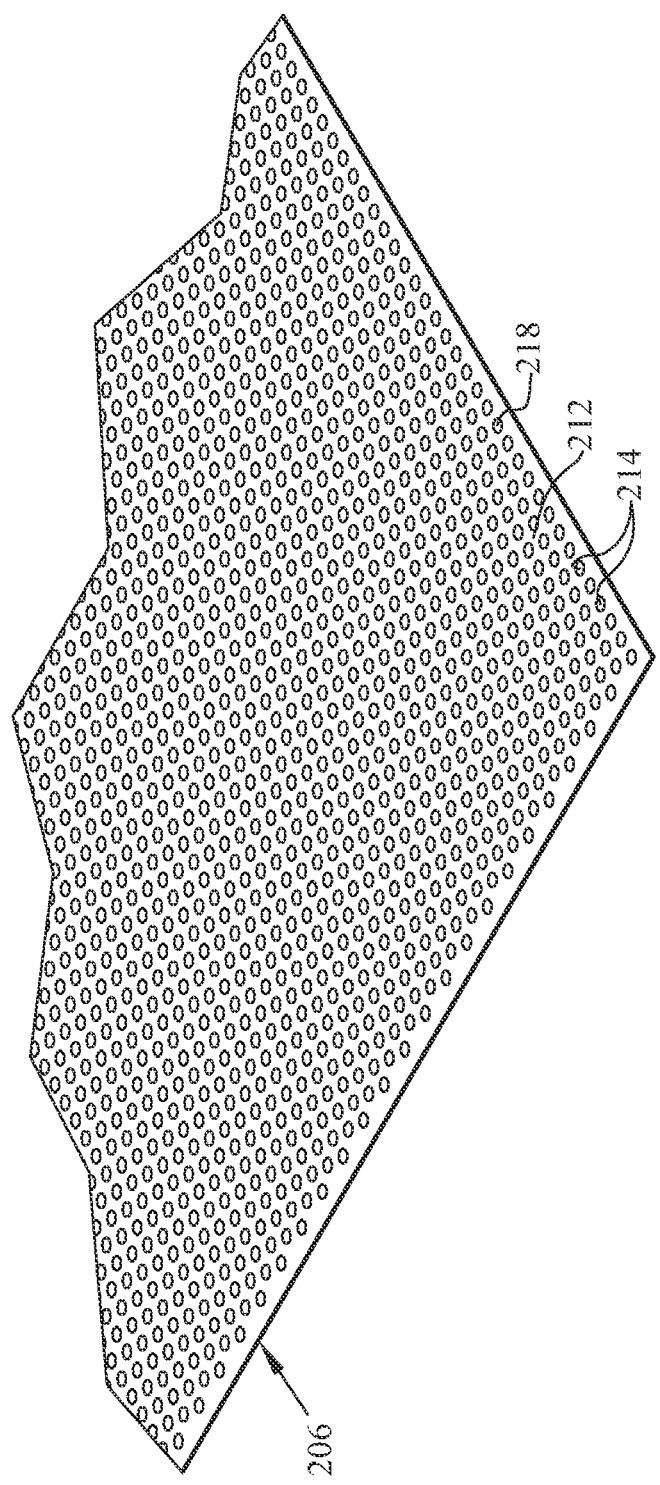
FIG. 6 is a perspective view of one embodiment of a vehicle frame liner and cargo bay liner of the subject invention, with top and bottom sheets removed, showing a face of the liner having openings therein.

Referring now to FIG. 5, an embodiment of a 3-ply panel from which the subject liner can be taken is generally indicated as 200. 3-ply panel 200 includes a top sheet 202, a bottom sheet 204, and a core generally indicated as 206. In a preferred embodiment, 3-ply panel 200 and core 206 is manufactured from polypropylene and is 100% recyclable. Core 206 may also be referred to as plastic honeycomb or plastic bubble board. 3-ply panel 200 may be provided in thicknesses of 10 mm, 5 mm or 3 mm. Applicant has found that the core 206 in a 3 mm thick 3-ply panel 200 is particularly suitable for use as a liner in accordance with the subject invention as will be discussed in further detail below. As can be seen in FIG. 5, core 206 has one face 208 having projections 210 extending upward therefrom. The opposite face 212 includes openings 214 extending downward into projections 212. Accordingly, projections 210 have a generally cylindrical configuration being hollow in the center thereof and including an end face 216 and side walls 218. Applicant has determined that one suitable 3-ply panel 200 from which core 206 may be extracted and used is IntePro® 3 mm Titan board from the IntePlast Group.

Referring now to FIGS. 6-11, further details, of vehicle frame and cargo area liner/core 206 are disclosed. As can be seen, the projections and/or openings 210, 214, respectively are aligned in a lengthwise direction of core 206 but going crosswise across core 206, projections 210 and openings 214 are staggered.

Figure 7:
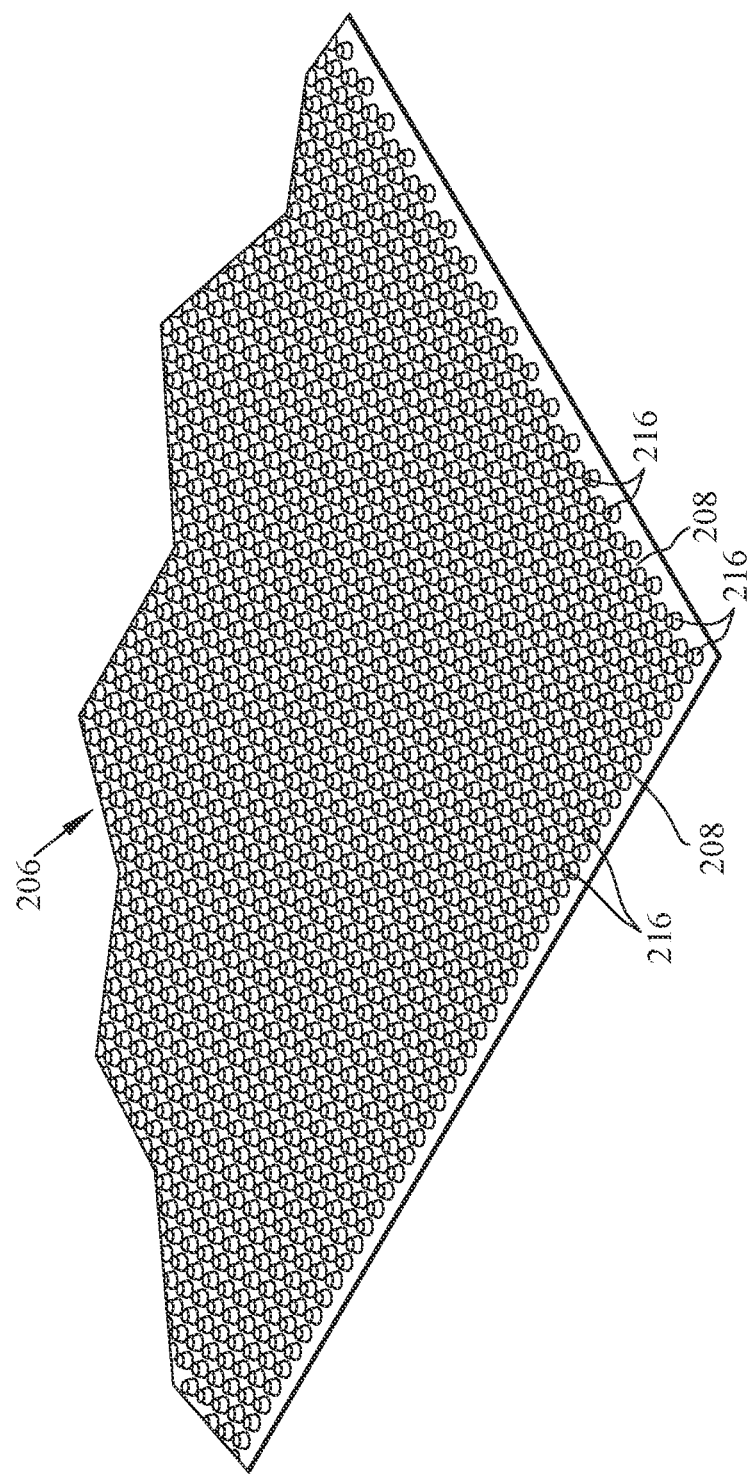
FIG. 7 is the vehicle frame and cargo bay liner of FIG. 6 showing an opposite face of the liner having projections extending therefrom.
Figure 8:
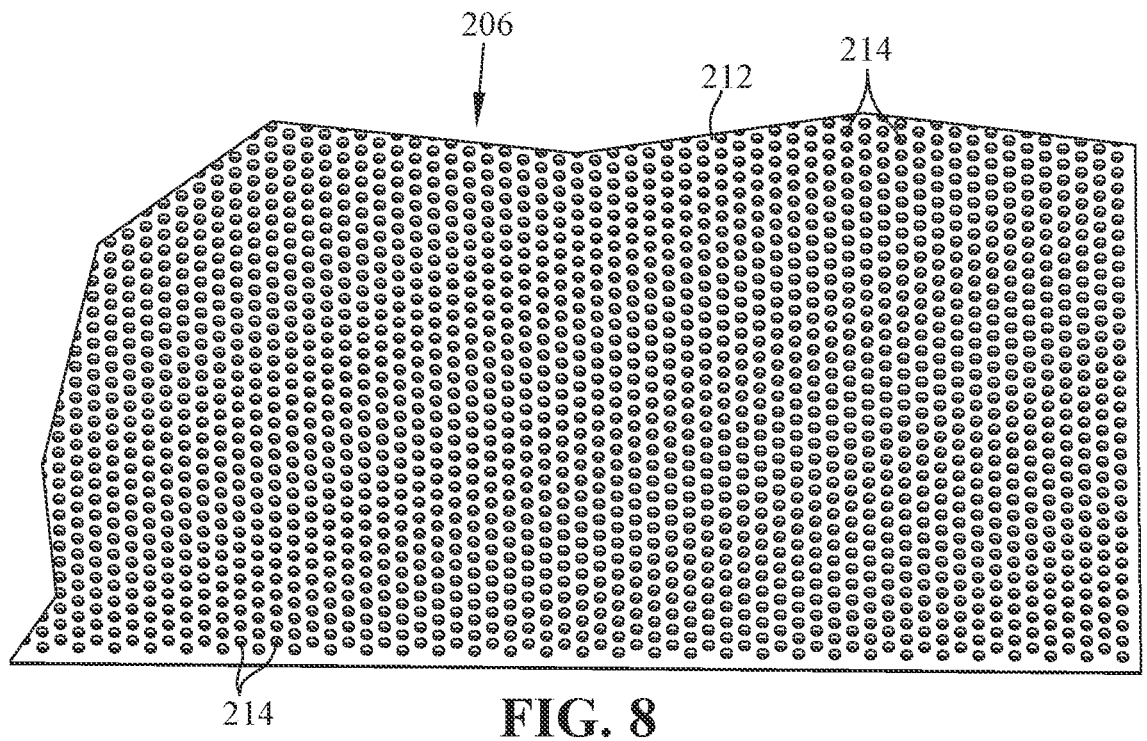
FIG. 8 is a plan view of the liner of FIG. 6 showing the face having openings.
Figure 9:
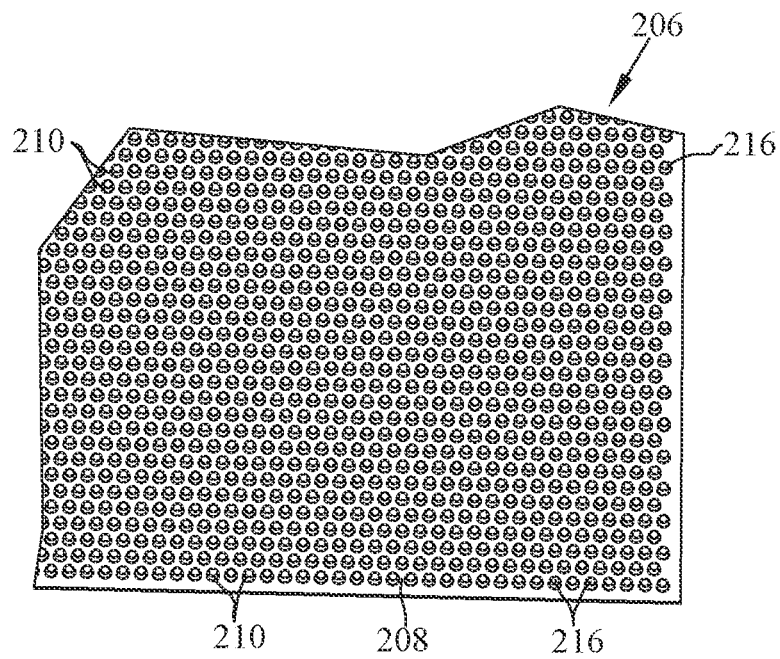
FIG. 9 is a plan view of the liner of FIG. 6 showing the face having projections extending therefrom.
Figure 10:
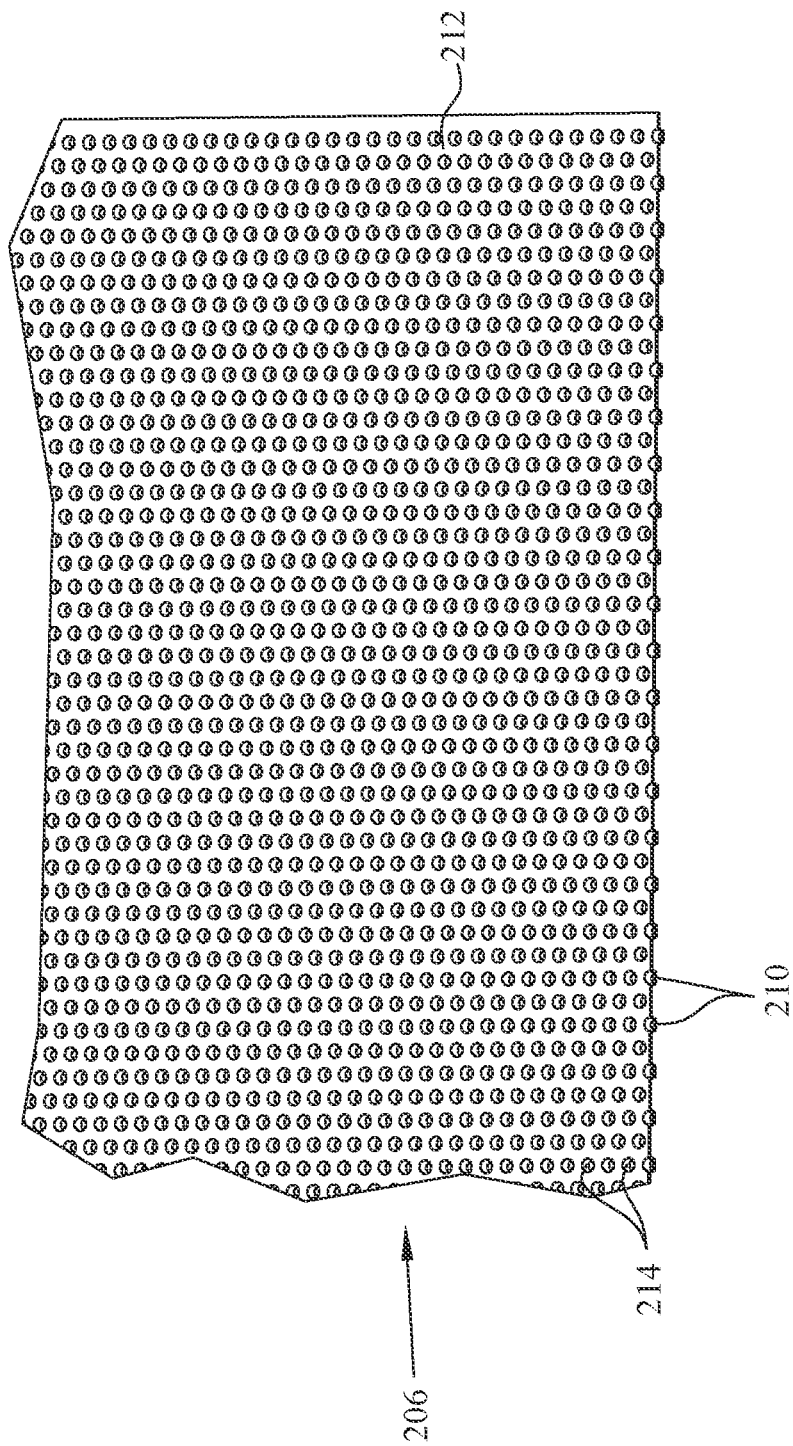
FIG. 10 is another perspective view of the vehicle and cargo bay liner of FIG. 6 with the face having openings facing upward.
Figure 11:
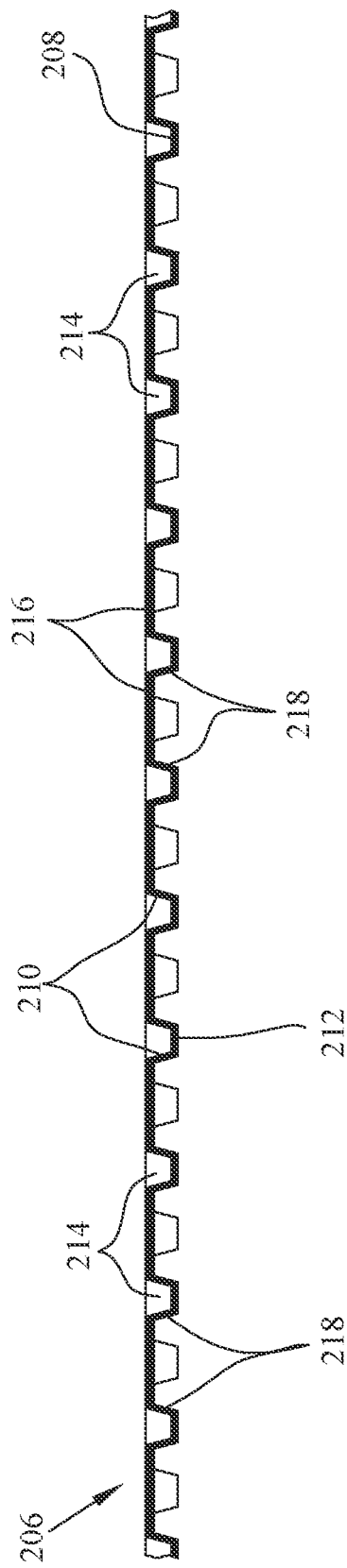
FIG. 11 is a side view of the vehicle and cargo bay liner of FIG. 6 with the projections extending upward.

Referring to FIG. 7, it can be appreciated that end faces 216 may have a variety of configurations including domed, flat, and/or convex.

In utilizing core 206 on recreational vehicle 10 and cargo trailer 40, core 206 is preferably provided in a rolled configuration. It is then unrolled and attached to frame assembly 32 or 58 using threaded fasteners or other attachment means known in the art. Core 206 may be attached with either face 208 having projections 210 or face 212 having opening 214 exposed to the environment on the underside of the recreational vehicle or cargo trailer. Although, heretofore it has been considered that liners and belly liners should have two flat sheets on top and bottom thereof, applicant has conceived that core 206 will provide a suitable liner and provide sufficient rigidity and protect the undercarriage of its vehicle while allowing moisture to better escape.

Regarding cargo area 61 in cargo trailer 40, preferably face 208 having projections 210 will be exposed on the interior of the cargo area. The projection side of the liner will absorb impacts from vehicle contained therein as well as allowing for a reservoir between end faces 216 and face 208 to allow any moisture, oil or grease to accumulate below end faces 216 to provide a more slip-resistant surface. Of course, face 212 having openings 214 may be utilized outwardly instead, particularly for liner 68 on the sides should it be desired to do so. Liners 66 and 68 in cargo trailer 40 may be attached using nails, staples, adhesive or other suitable means of attachment.

Figure 12:
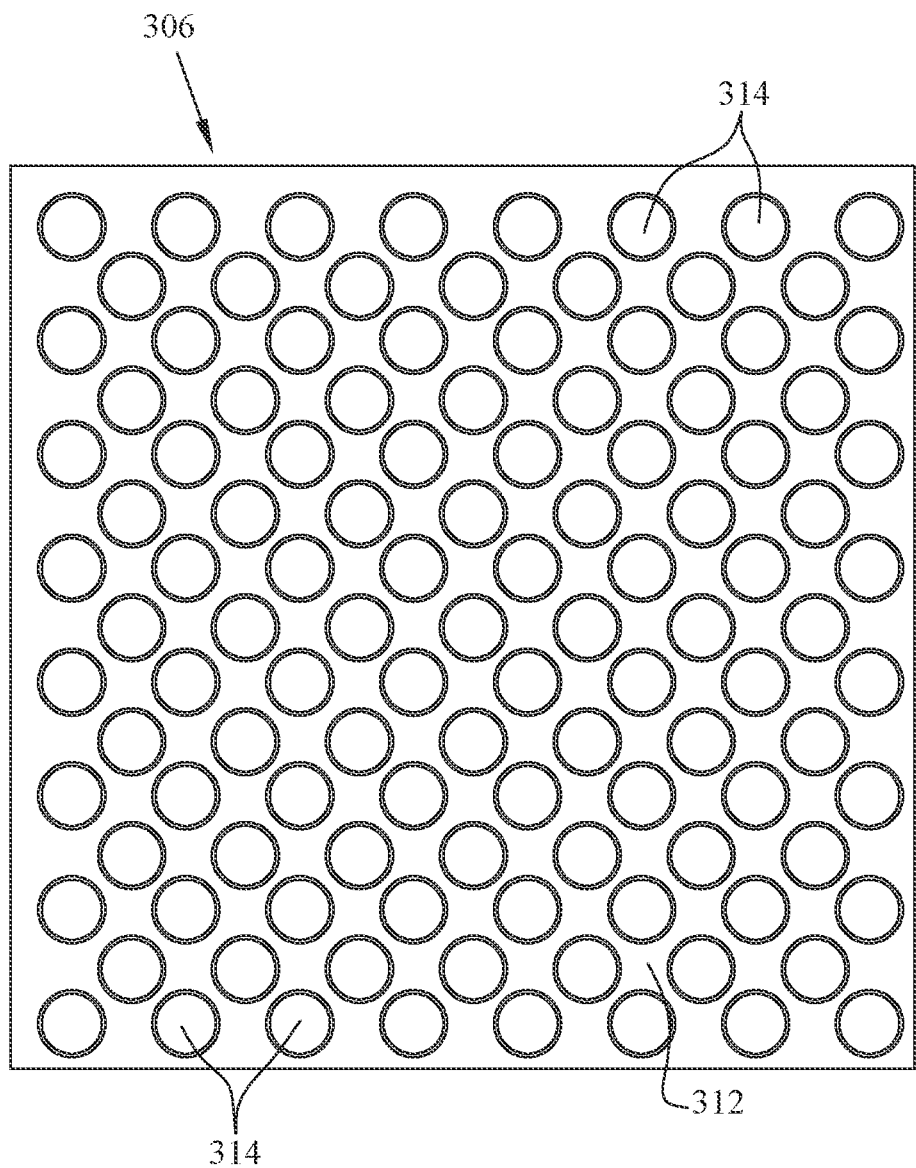
FIG. 12 is a plan view of an alternate embodiment vehicle frame and cargo bay liner showing a face having openings therein.
Figure 13:
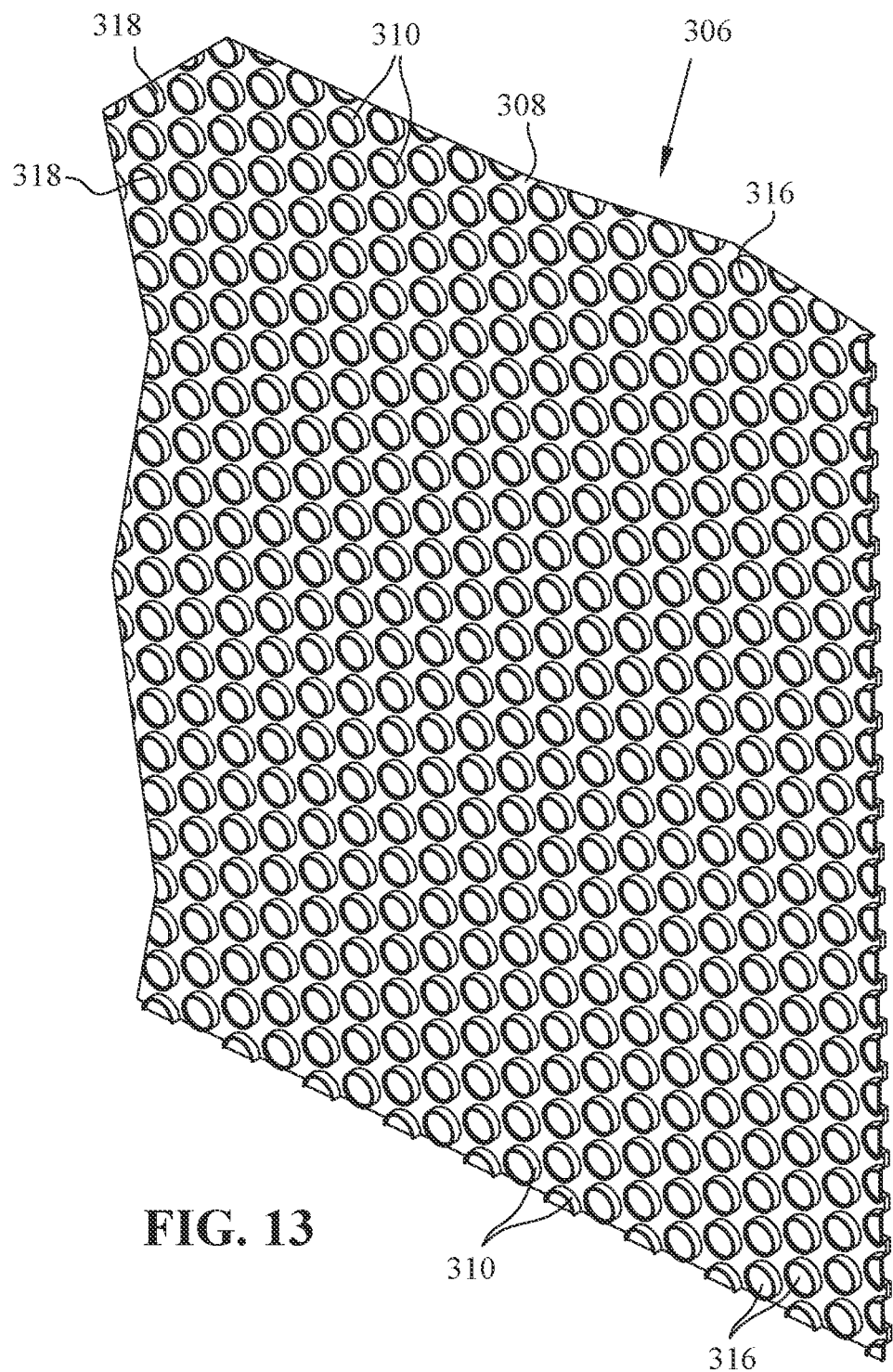
FIG. 13 is a plan perspective view of the alternate embodiment vehicle frame and cargo bay liner of FIG. 12 showing a face having projections extending therefrom.

Now referring to FIGS. 12 and 13, an alternate vehicle frame and cargo area liner is shown generally indicated as 306. As can be seen in FIG. 13, liner 306 includes a face 308 having projections 210 thereon. As shown in FIG. 12, liner 306 has an opposite face 312 having openings 314 therein. Projections 310 include end faces 316 and sidewalls 318 as best seen in FIG. 13. Line 306 can be manufactured from single or multi-layer materials sandwiched together (twin or triple layer).

Figure 14:
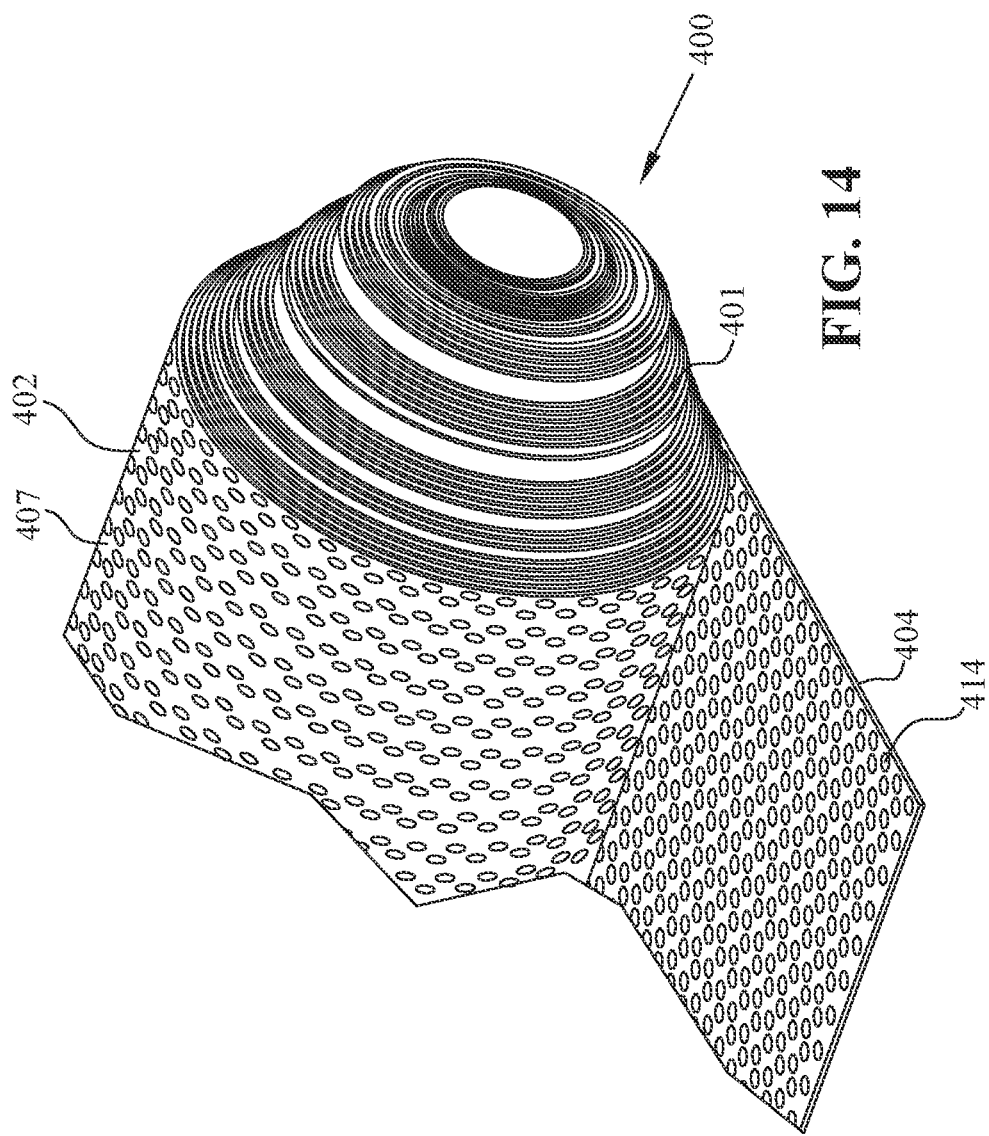
FIG. 14 is a perspective view of another alternate embodiment vehicle frame and cargo bay liner shown rolled in a coil and having aluminum foil on one side thereof.
Figure 15:
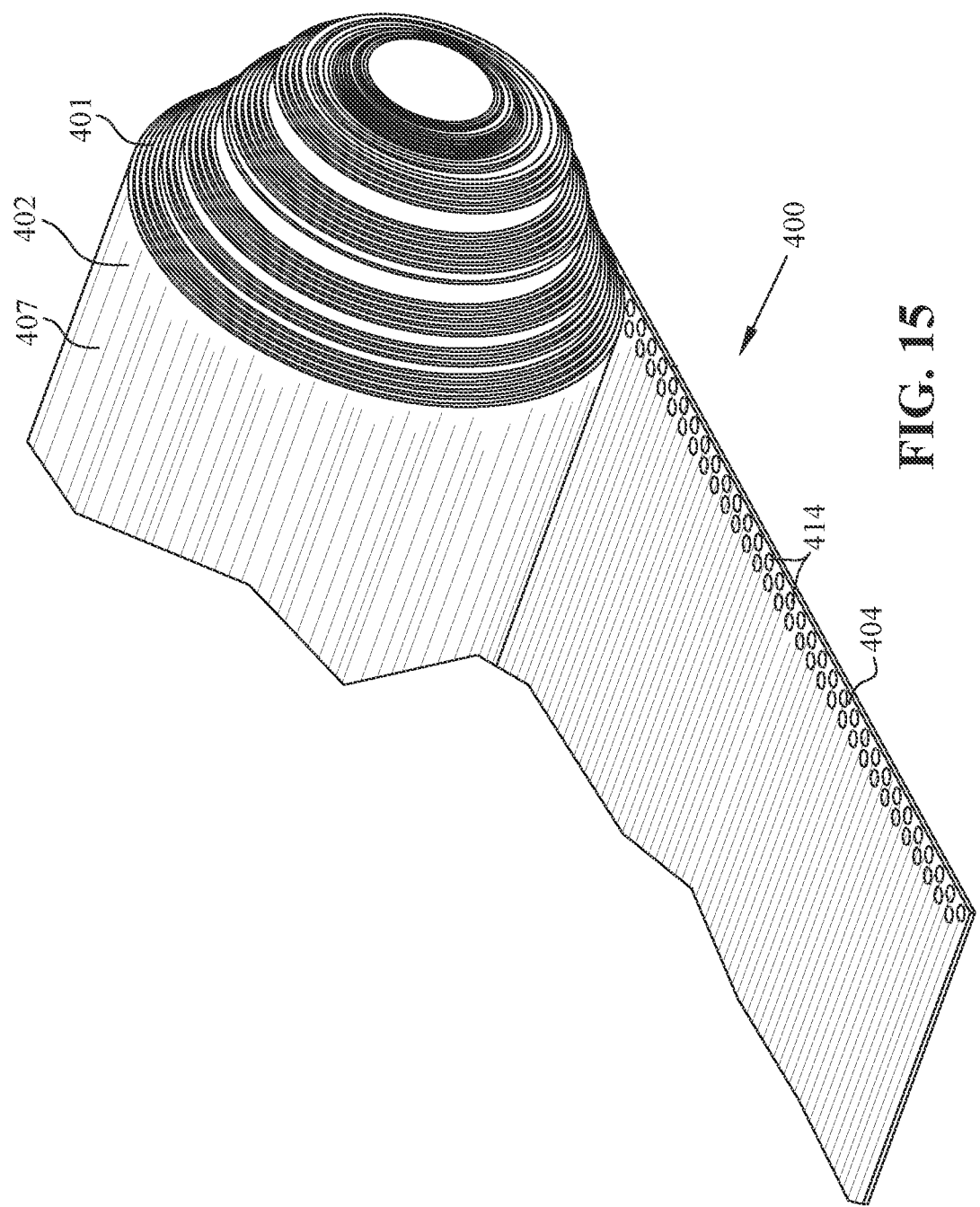
FIG. 15 is a perspective view of the vehicle frame and cargo bay liner of FIG. 14 partially rolled out showing the aluminum foil on a top side thereof.
Figure 16:
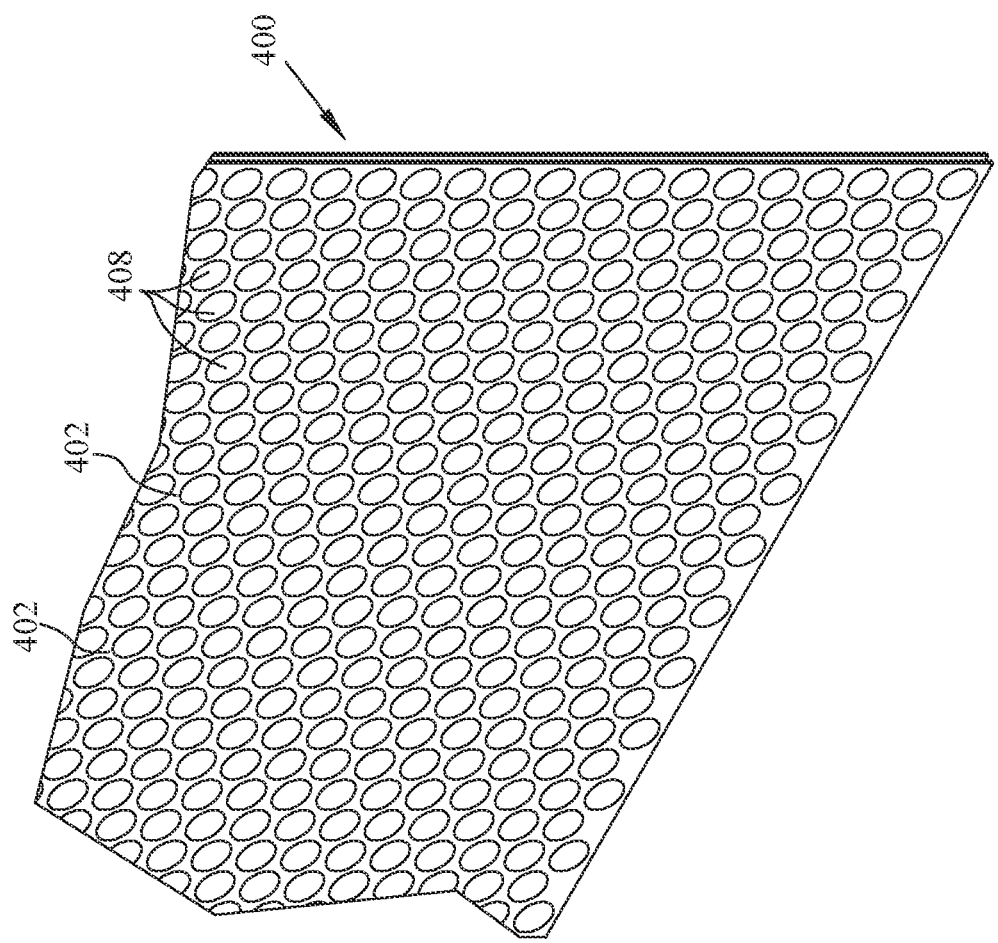
FIG. 16 is a plan view of the vehicle frame and cargo bay liner of FIG. 14 showing the top side with aluminum foil thereon.
Figure 17:
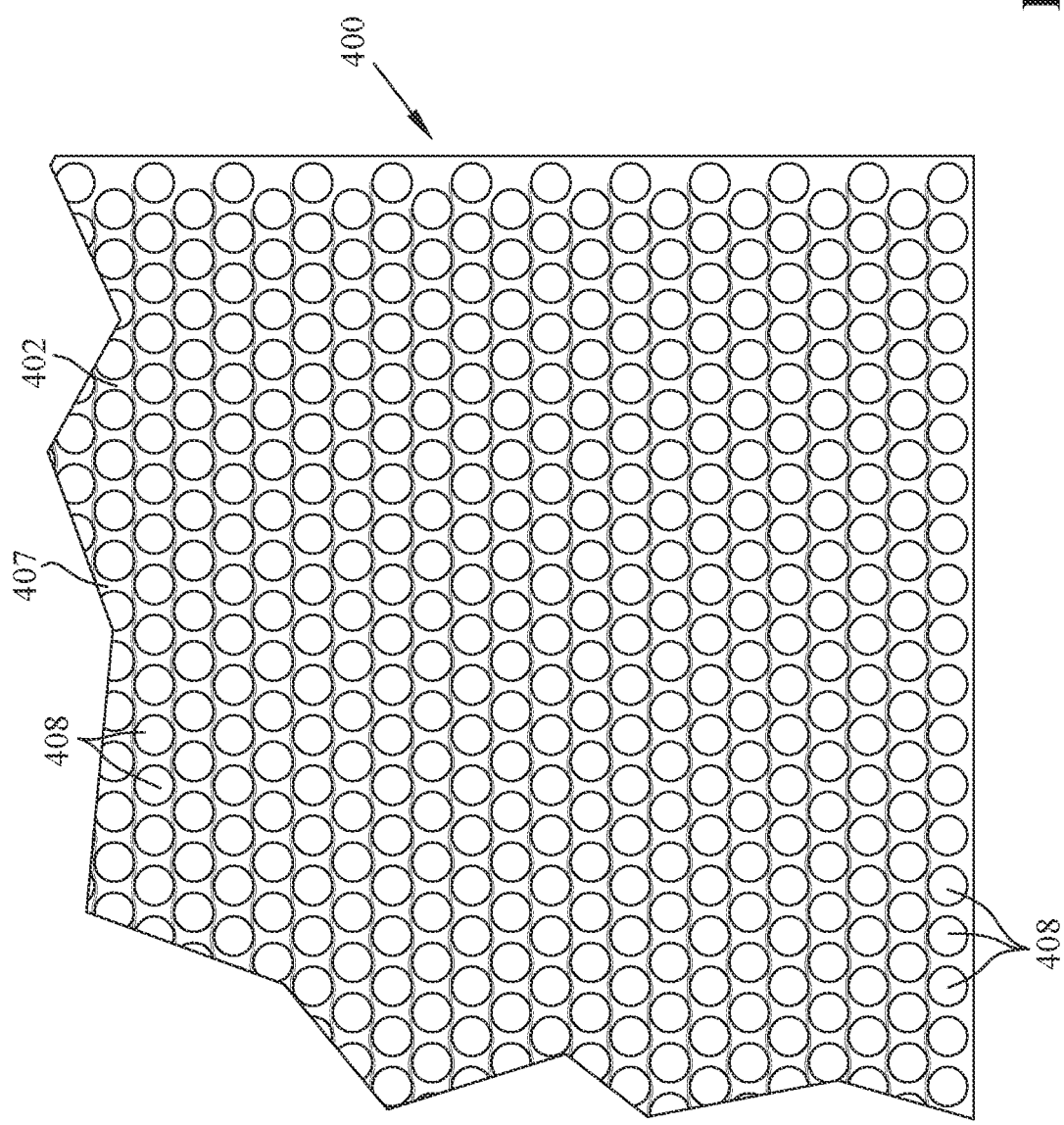
FIG. 17 is an enlarged plan view of the vehicle frame and cargo bay liner of FIG. 14 of the top side having aluminum foil thereon.
Figure 18:
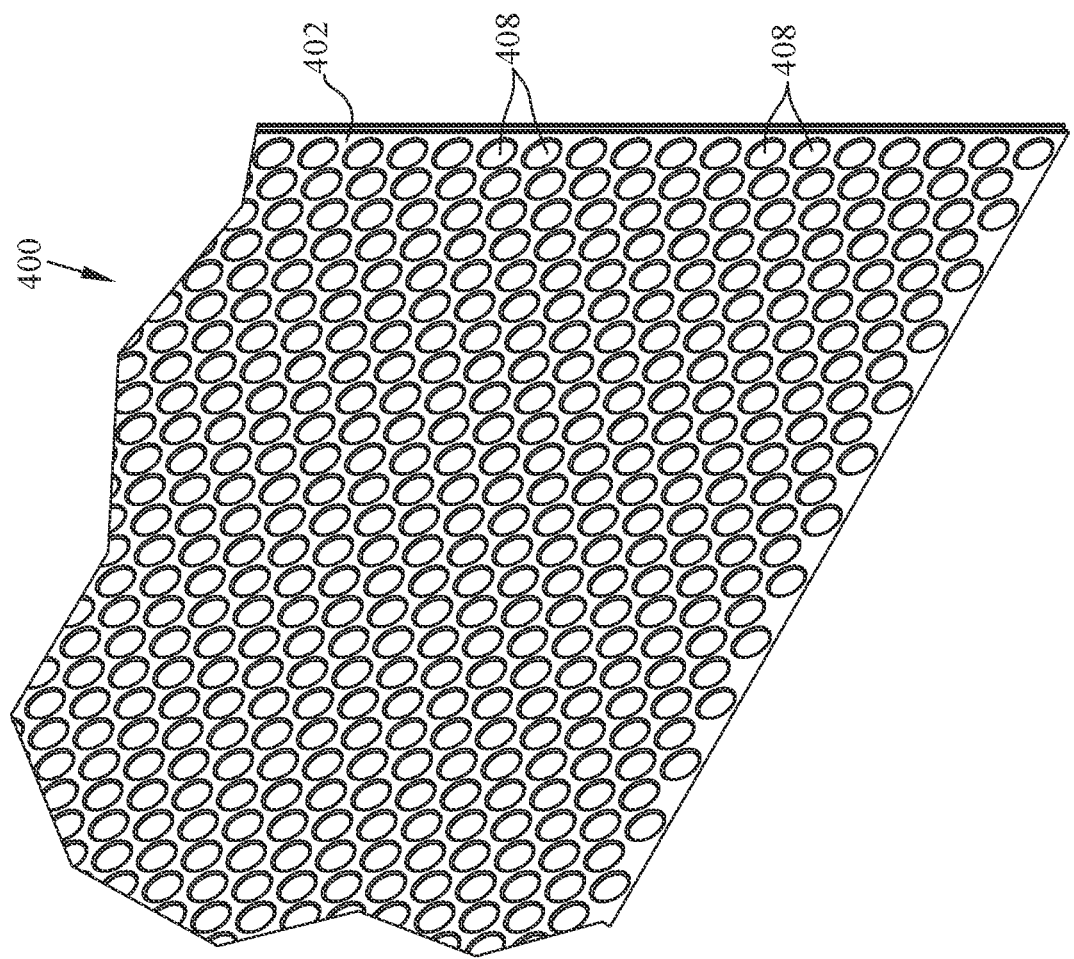
FIG. 18 is a top plan perspective view of the vehicle frame and cargo bay liner of FIG. 14 having the aluminum removed from the top side thereof.
Figure 19:
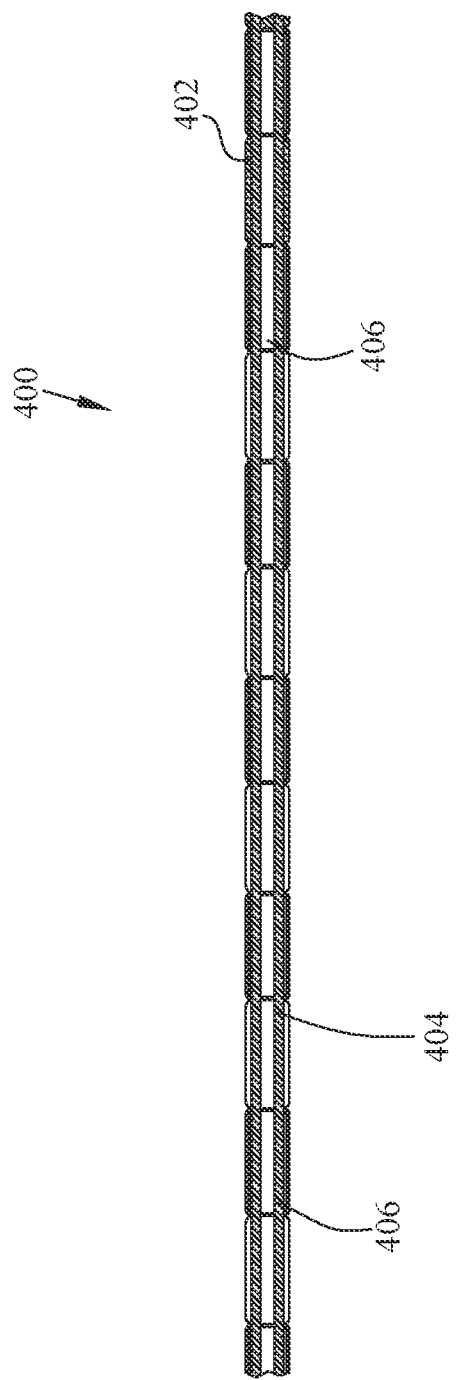
FIG. 19 is a side perspective view of the vehicle frame and cargo bay liner of FIG. 14 with the aluminum foil removed.
Figure 20:
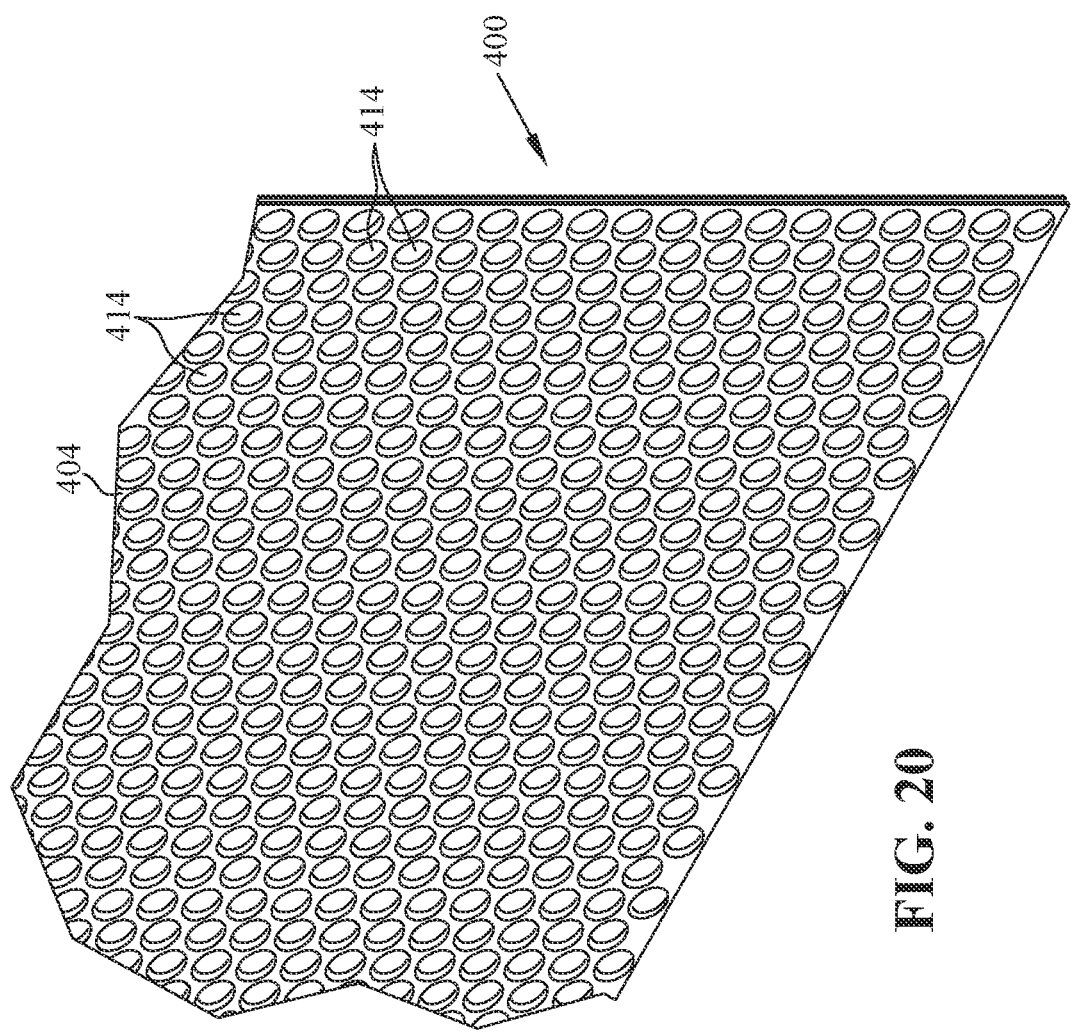
FIG. 20 is a plan perspective view of the bottom side of the vehicle frame and cargo bay liner of FIG. 14.
Figure 21:
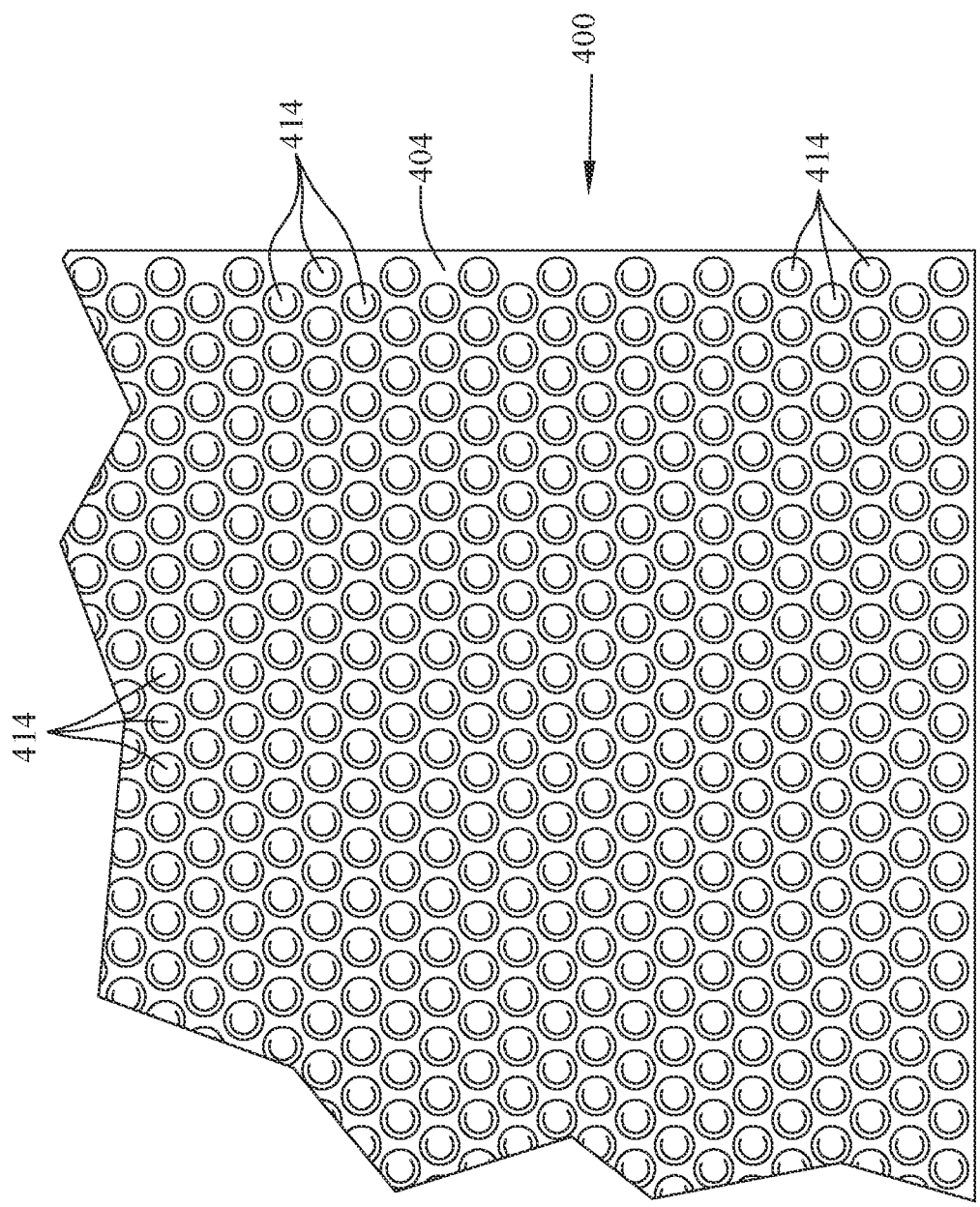
FIG. 21 is an enlarged bottom plan perspective view of the vehicle frame and cargo bay liner of FIG. 14.

Now referring to FIGS. 14-24, another alternate vehicle frame and cargo area liner is shown generally indicated as 400. Liner 400 can be provided in a coiled form 401 as shown in FIGS. 14 and 15, making it extremely suitable for use as a liner for vehicle frames and cargo bays. The desired length of liner can be rolled out and cut to size for assembly to the vehicle. Vehicle frame and cargo bay liner 400 is of a 3-ply configuration and includes a top ply, sheet, or layer 402 and a bottom ply, sheet, or layer 404. A core 406 (see FIGS. 19 and 22-24) separates top sheet 402 from bottom sheet 404. Additionally, vehicle frame and cargo bay liner 400 also includes a sheet of aluminum foil or metalized film 407 on one side thereof. In the embodiment shown, aluminum foil/metalized film 407 is provided on top sheet 402; however, it should be appreciated that aluminum foil or metalized film could also be provided on the bottom sheet 404. Aluminum foil or metalized film 407 may be adhered to top sheet 402 using an adhesive or other suitable means. The metalized film can be a polymer film coated with a thin layer of metal, which can be aluminum or other suitable metal.

Figure 22:
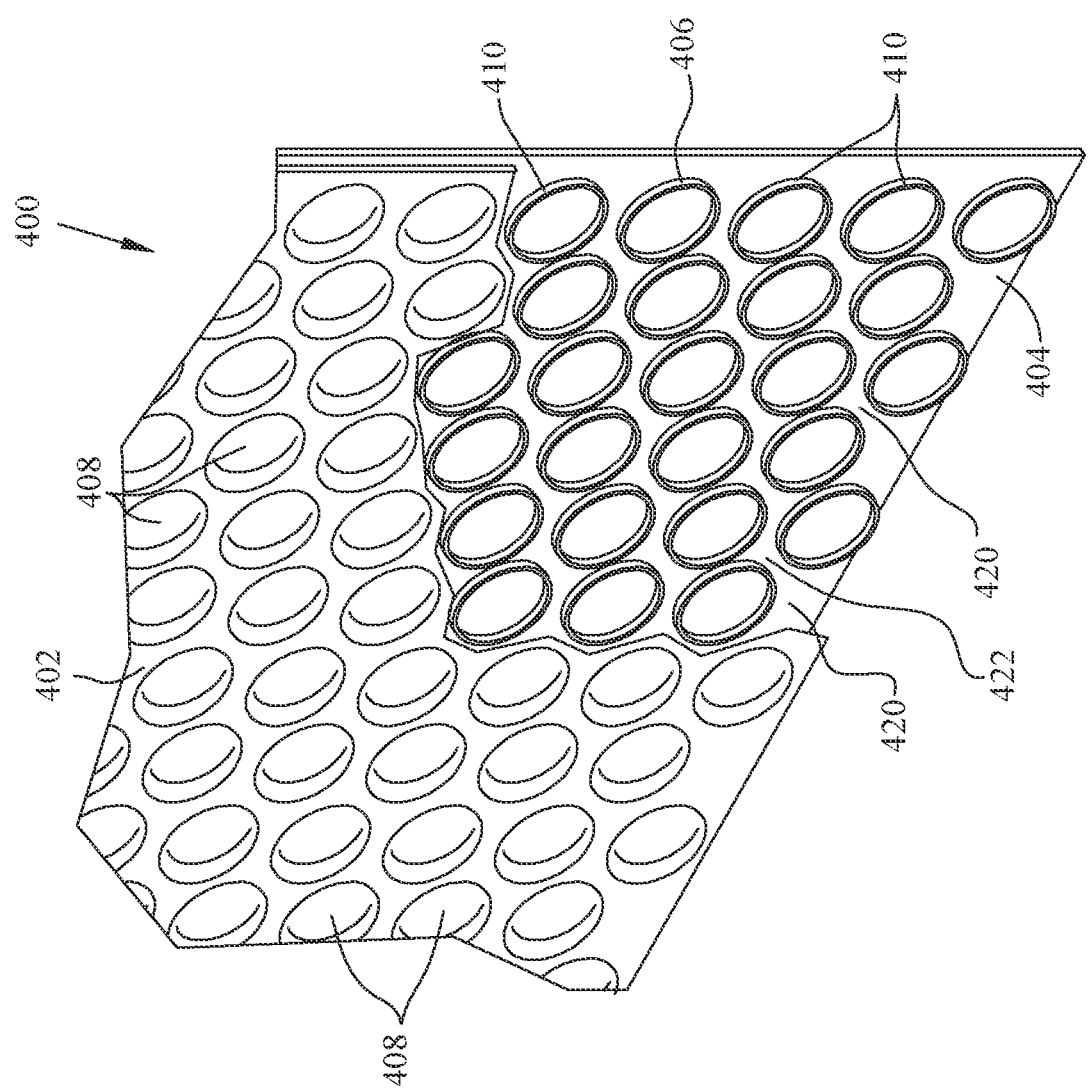
FIG. 22 is a perspective view of a portion of the vehicle frame and cargo bay liner of FIG. 14 showing part of the top layer removed.
Figure 23:
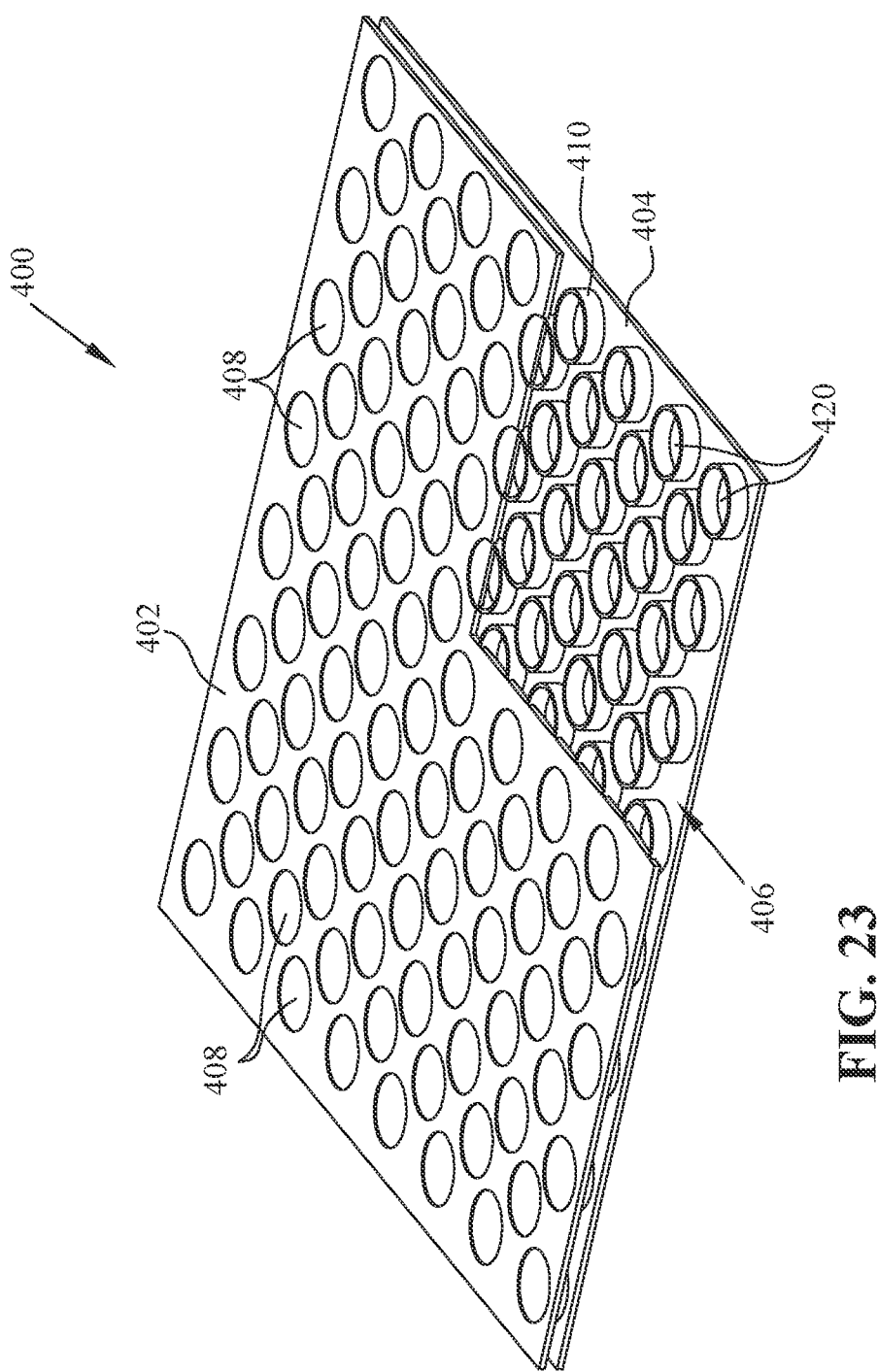
FIG. 23 is another perspective view of a portion of the vehicle frame and cargo bay liner of FIG. 14 with part of the top layer removed.
Figure 24:
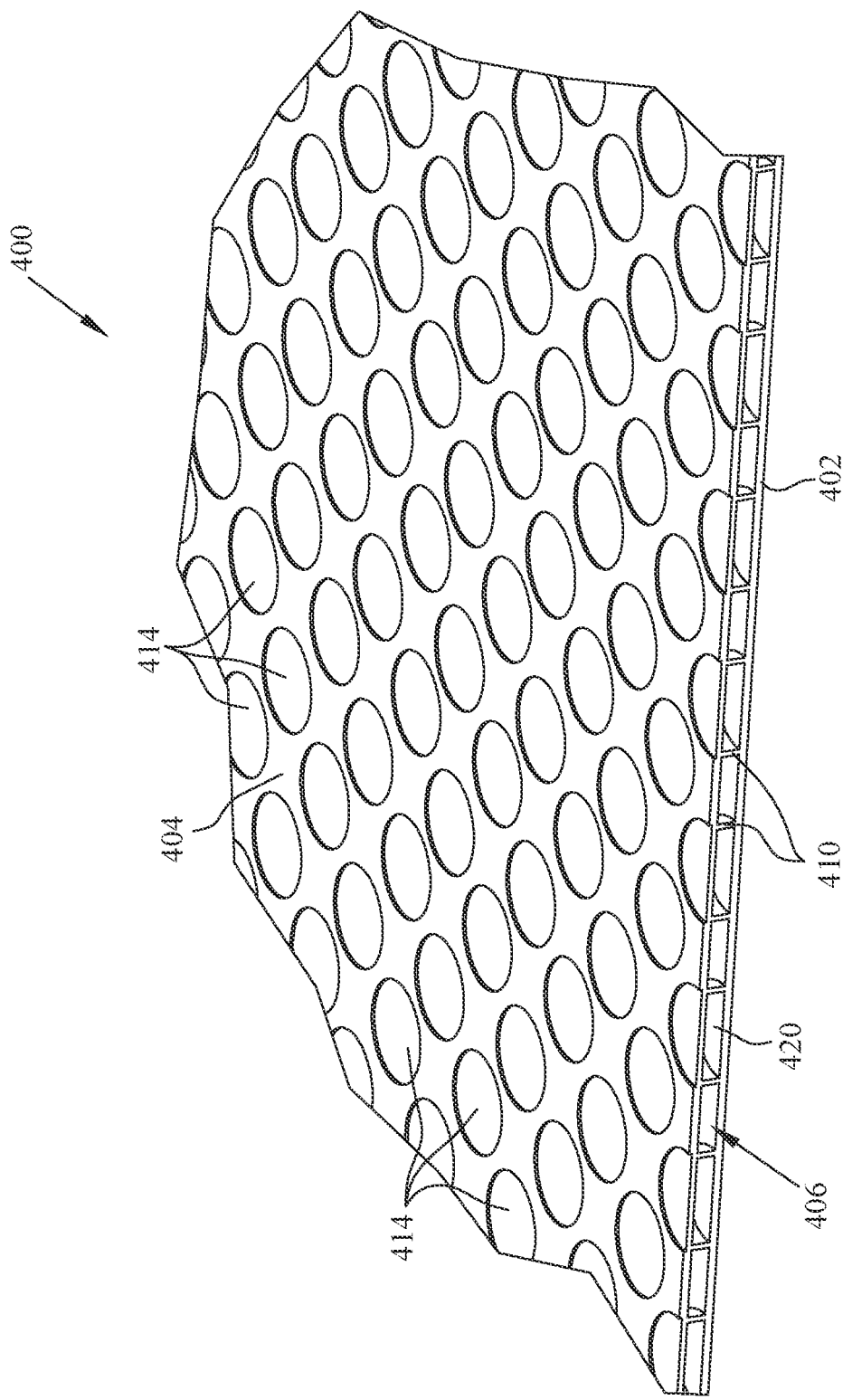
FIG. 24 is a perspective view of the bottom side of a portion of the vehicle frame and cargo bay liner of FIG. 14.

In the embodiment shown, vehicle frame and cargo bay liner 400 also includes a plurality of circular convexities 408 on top sheet 402 and a corresponding plurality of circular dimples or depressions 414 in bottom sheet 404. Vehicle frame and cargo bay liner 400 also includes a plurality of cylindrical projections 410 extending up from bottom sheet 404 and attached to top sheet 402 (see FIGS. 22 and 23). Projections 410 may be thermally bonded to top sheet 402 as well as to bottom sheet 404. As can be seen in FIGS. 22-24, circular convexities 408 and circular depressions 414 coincide with cylindrical projections 410. Also, as should be appreciated, cylindrical projections 410 form the core of vehicle frame and cargo bay liner 400.

As can be seen in FIGS. 22 and 23, cylindrical projections 410 form an obstruction to passage through core 406 such that any water entering the ends thereof is obstructed and impeded or hindered from propagating across liner 400 as compared to channels 111 in corrugated liner 104, which readily allow transport of liquids. Additionally, as where vehicle frame and cargo bay liner 400 is cut, it will intersect a plurality of cylindrical projections 410 in the liner. As each cylinder is closed off, any water entering into an end of the liner where a projection has been cut will be prevented from further propagating by encountering the wall of the projection. Only a small area or channel 422 between cylindrical projections would allow any water or moisture to enter into core 406 of liner 400, but that will not readily propagate to the offset projections internal to core 406 that will impede or hinder any advancement of the moisture.

When rolled out and installed on a frame 32 of a recreational vehicle, aluminum sheet or foil or metalized film 407 of liner 400 will preferably be disposed toward the living quarters of the recreational vehicle. Accordingly, the foil/film provides an additional insulation barrier between the ground and living quarters. The aluminum foil/metalized film could be placed towards the ground of a recreational vehicle; however, any stones or debris kicking up may create tearing or holes therein. Additionally, vehicle frame and cargo bay liner 400 may be utilized without the foil/film thereon if desired.

A list of properties for one embodiment for vehicle frame and cargo bay liner 400 is shown below in Table A1:

| A1 | | |
|---|---|---|
| Property | Unit | Result |
| Product cross section | | Aluminum film/airbubble PE ø = 10 mm/Plastic Film |
| Roll Dimension* *Up to 2500 MM wide and Cut Length | m × m | 2.5 × 40 |
| Thickness | mm | 4 (+0.3) |
| Weight | Kg/roll | 25.00 (+0.3) |
| Density | g/m$^2$ | 250.00 |
| Temperature measurement above/below (insulation panel) | °C. | 50/37 |
| Water Vapor transmission | g/m$^2$/24 hrs | 0.0 |
| Resistance to mold and bacteria | | Yes |
| Toxicity | | No |

Figure 25:
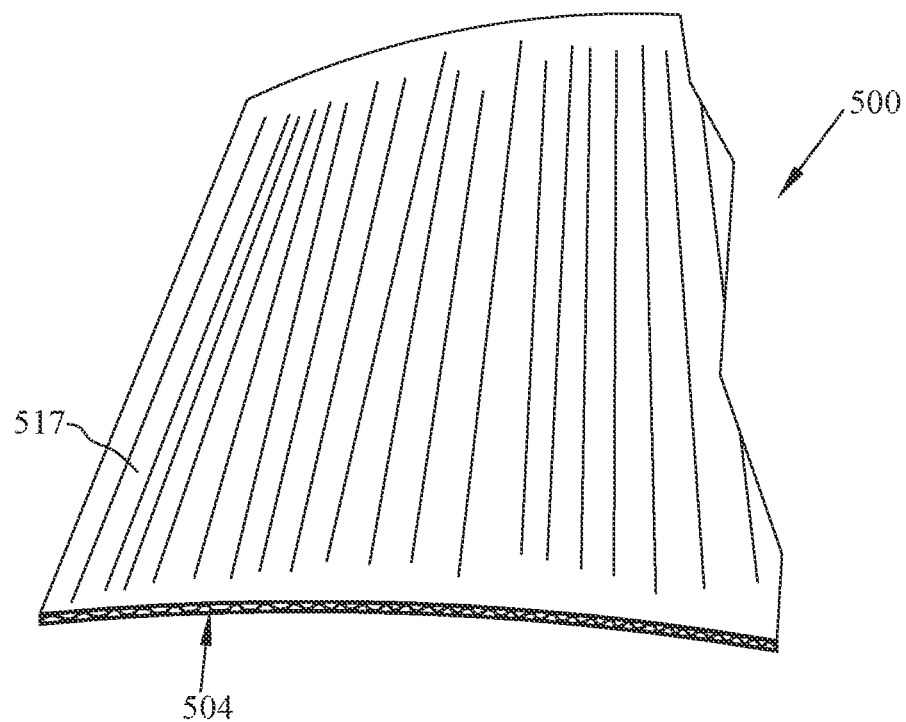
FIG. 25 is a perspective view of an additional alternate embodiment vehicle frame and cargo bay liner shown laid out and having an aluminum foil on one side thereof.
Figure 26:
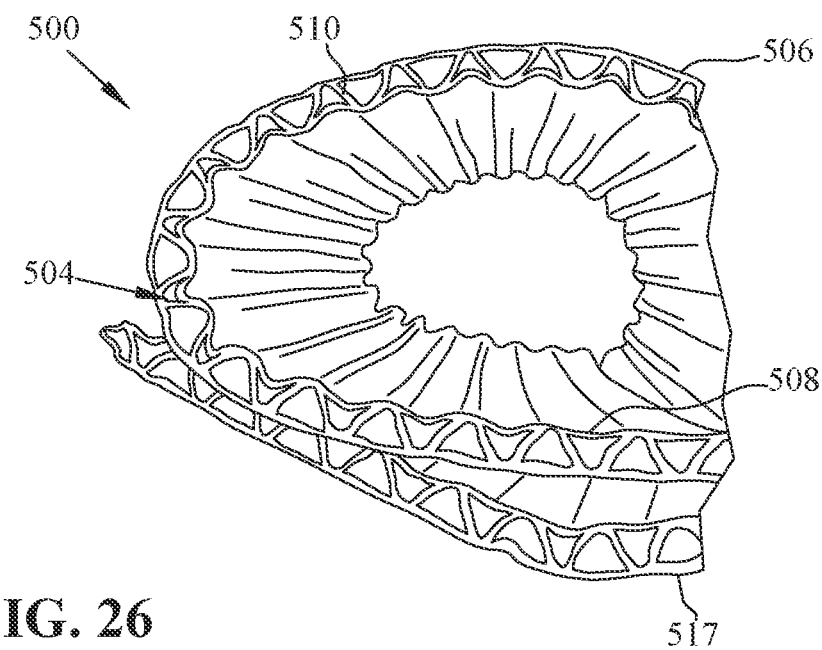
FIG. 26 is an end view of the vehicle frame and cargo bay liner of FIG. 25 shown rolled up wherein corrugations of the liner are readily visible.
Figure 27:
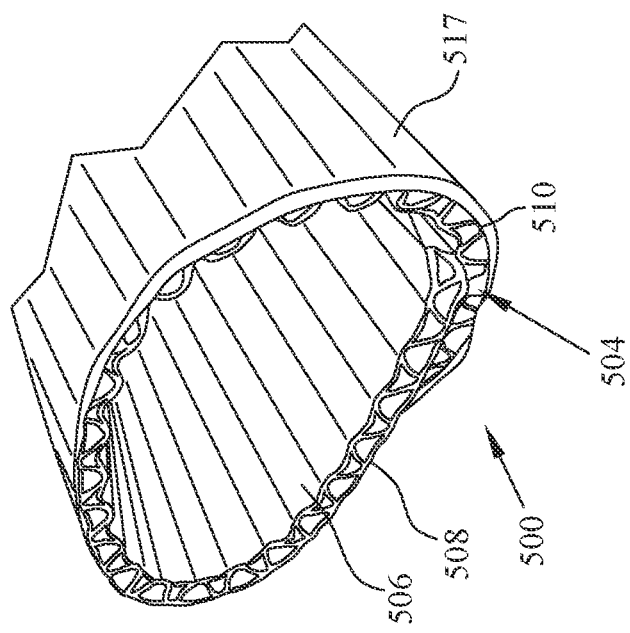
FIG. 27 is a perspective view of the vehicle frame and cargo bay liner of FIG. 25 rolled up with the aluminum foil on the outside thereof.

Now referring to FIGS. 25-27, other alternate embodiment vehicle frame and cargo area liner is shown generally indicated as 500. Liner 500 includes a corrugated liner, generally indicated as 504. Corrugated liner 504 includes a top sheet 506, a bottom sheet 508, and a corrugated or sinusoidal ply 510 extending therebetween, as best shown in FIGS. 26 and 27. Top sheet 506 and bottom sheet 508 each have a generally planar configuration, not including any rolling memory that may be embedded therein and are adhered or thermally attached to corrugated ply 510. It should be appreciated that the corrugated ply is defined to include either a sinusoidal configuration as shown in FIGS. 26 and 27 or alternately a plurality of member perpendicular to top sheet 506 and bottom sheet 508 such as is shown in the material utilized in FIGS. 7 and 8 of U.S. Pat. No. 10,000,930 B2 to Lowe et al., which is incorporated in its entirety herein by reference. In one embodiment, corrugated liner 504 is polyethylene. Of course, other materials, and in particular, polymers such as polypropylene may be used for corrugated liner 504. As best shown in FIG. 26, when the corrugated liner 504 is rolled, the outer sheet will become stretched and the inner sheet may fold as shown with top sheet 506, and bottom sheet 508 in FIG. 26, respectively.

Additionally, vehicle frame and cargo area liner 500 also includes an aluminum foil or sheet or metalized film 517 adhered to top sheet 506 of corrugated liner 504. Aluminum foil or sheet or metalized film 517 is preferably mounted so that it is between corrugated liner 504 and housing or living quarters 14 of the recreational vehicle 10, in order to provide additional protection and insulation to the living quarters. However, aluminum foil or sheet or metalized film 517 may also be mounted downwardly on the vehicle frame so that it is facing the road surface. It should be appreciated that aluminum foil or sheet or metalized film 517 may be adhered to bottom sheet 508 rather than top sheet 506. Vehicle frame and cargo area liner 500 may be mounted to a vehicle frame 32 utilizing means discussed above or other known means.

Figure 28:
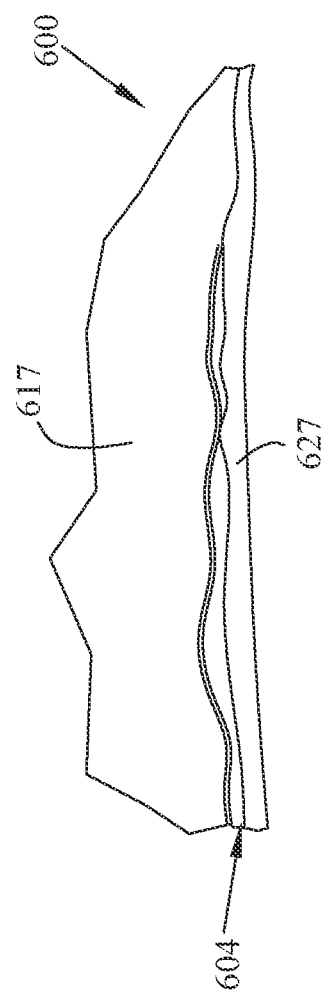
FIG. 28 is an end perspective view of another alternate embodiment vehicle frame and cargo bay liner shown laid out and having aluminum foil on both sides thereof.

Now referring to FIGS. 28-30, an additional embodiment of a 3-ply panel vehicle frame and cargo area liner is generally indicated as 600. As with vehicle frame and cargo area liners 500, vehicle frame and cargo area liner 600 includes a corrugated liner, generally indicated as 604. Corrugated liner 604 includes a top sheet 606, a bottom sheet 608, and a corrugated or sinusoidal ply 610 extending therebetween. Top sheet 606 and bottom sheet 608 are adhered or thermally attached to corrugated ply 610 and may be made from materials similar to corrugated liner 500, such as but not limited to polyurethane or polyethylene. Alternately, liner 600 may be an extruded manufactured design, as is well known in the art, including a top ply, a bottom ply and transverse supports, extending between the top and bottom plies, which can include square or rectangular passageways between the plies. Likewise, the extruded liner may be manufactured form materials such as, but not limited to polyurethane or polyethylene.

As with vehicle and frame and cargo area liner 500, liner 600 also includes an aluminum foil or sheet 617 adhered to top ply or sheet 606. Additionally, however, vehicle frame and cargo area liner 600 also includes a second aluminum foil or sheet 627 adhered to bottom sheet or ply 608 of corrugated liner 604.

Vehicle frame and cargo area liner 600 may be installed on frame assembly 32 of recreational vehicle 10 in a similar manner as vehicle frame and cargo area liner 500 or as described above for the other embodiments. However, with vehicle frame and cargo area liner 600, it may be installed with either top face 606 and aluminum foil/sheet 617 facing the living area 14 of recreational vehicle 10 and bottom sheet or ply 608 and aluminum foil or sheet or metalized film 627 facing the road surface or this may be reversed as vehicle frame and cargo area liner 600 is similar on both the upper and bottom sides thereof. Although the top and bottom side area reversible, it should be appreciated that if vehicle frame and cargo area liner 600 is provided in a rolled form, it may be installed insulation with either top side 606 or bottom side 608 facing the living quarters of recreational vehicle 10 as is easiest for installation considering any rolling memory contained in corrugated liner 604. The second layer of aluminum foil or sheet or in metalized film vehicle frame and cargo area liner 600 provides additional insulation and protection to the living quarters of recreational vehicle 10.

Now referring to FIGS. 31-34, another alternate vehicle frame and cargo area liner is shown generally indicated as 700. Liner 700 can be provided in a coiled form as liner 400, making it extremely suitable for use as a liner for vehicle frames and cargo bays. The desired length of liner can be rolled out and cut to size for assembly to the vehicle. Vehicle frame and cargo bay liner 700 is of a 3-ply configuration and includes a top ply, sheet, or layer 702 and a bottom ply, sheet, or layer 704. A core 706 (see FIG. 31) separates top sheet 702 from bottom sheet 704. Additionally, vehicle frame and cargo bay liner 700 also includes a sheet of aluminum foil or metalized film 707 on one side thereof. In the embodiment shown, aluminum foil/metalized film 707 is provided on bottom sheet 404; however, it should be appreciated that aluminum foil/metalized film could also be provided on the top sheet 702 (see embodiment 700A discussed below). Aluminum foil/film 707 may be adhered to bottom sheet 704 using an adhesive or other suitable means. Vehicle frame and cargo bay liner 700 also includes a woven or nonwoven layer of material 709 adhered to top layer 702, opposite the side with aluminum foil 707 or metalized film. In one embodiment, material 709 is a woven sheet of polypropylene fabric.

Figure 31:
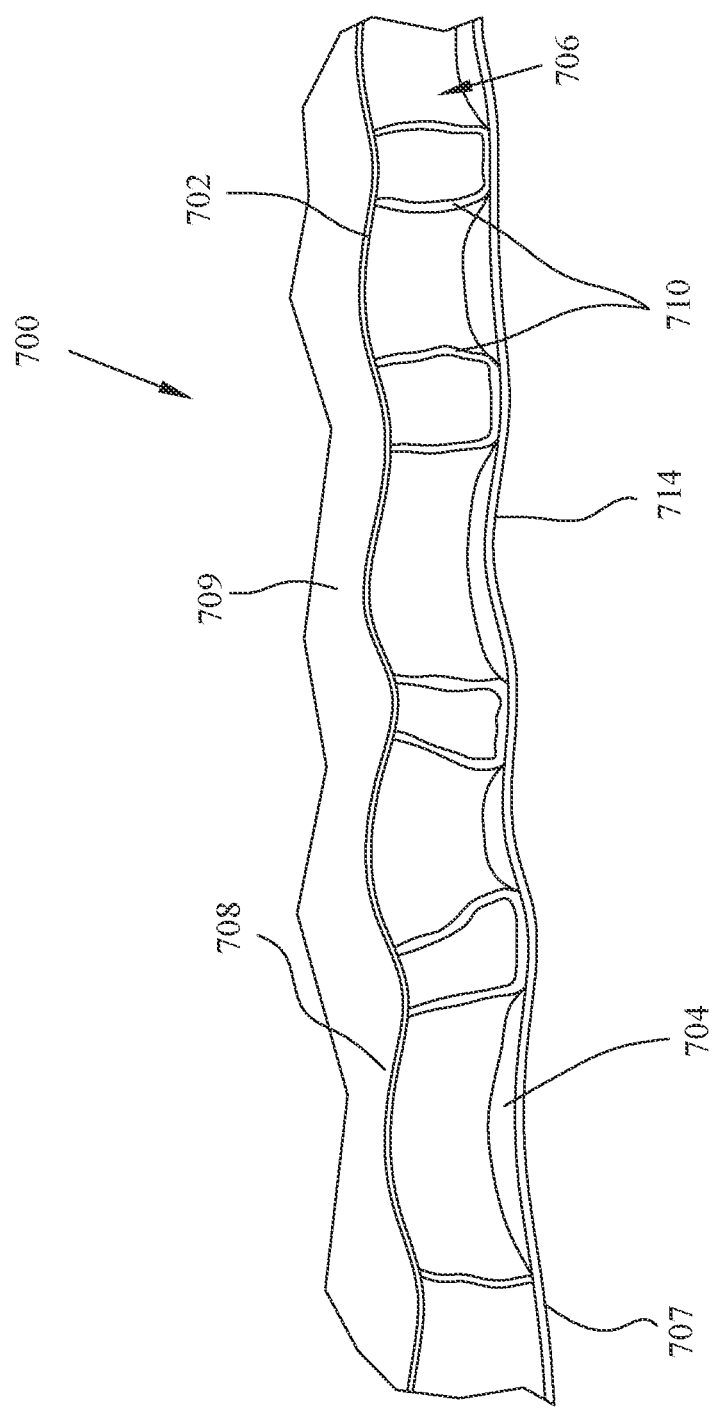
FIG. 31 is a side perspective view of yet another alternate embodiment vehicle frame and cargo bay liner having an aluminum foil on one side and a woven material on the opposite side
Figure 32:
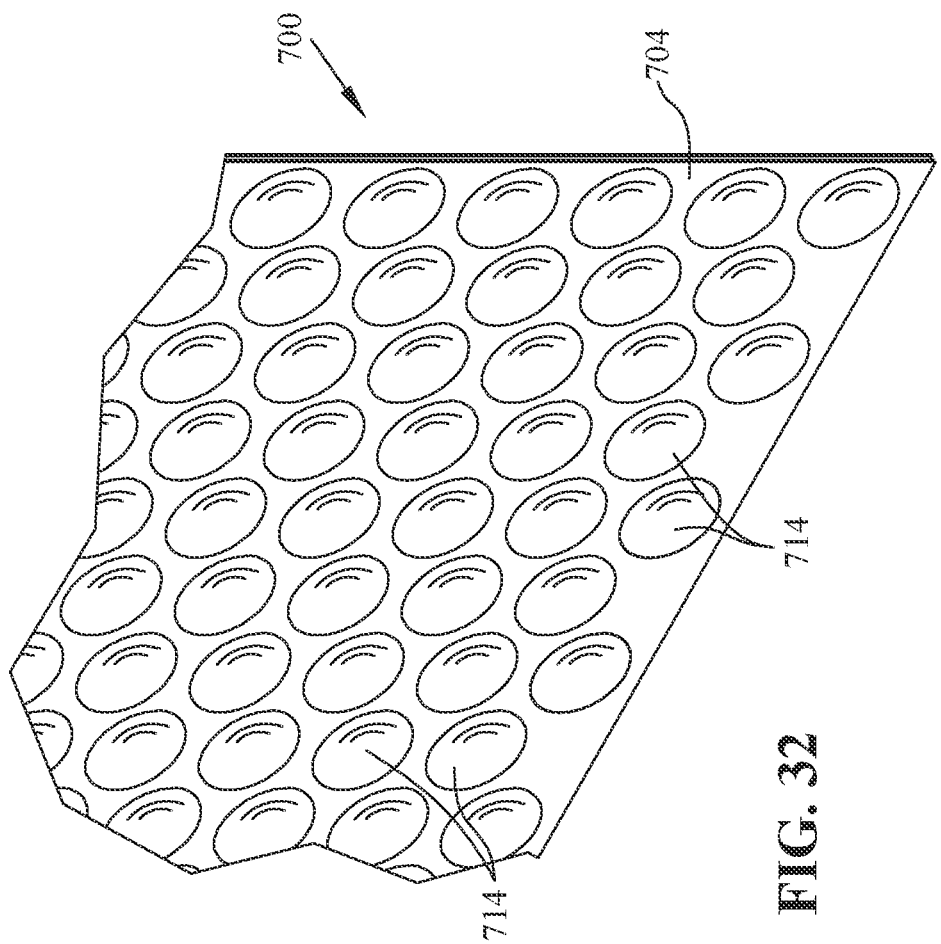
FIG. 32 is a plan view of the vehicle frame and cargo bay liner of FIG. 31 with the aluminum foil and woven material removed show a layer of the liner having dimples thereon.
Figure 33:
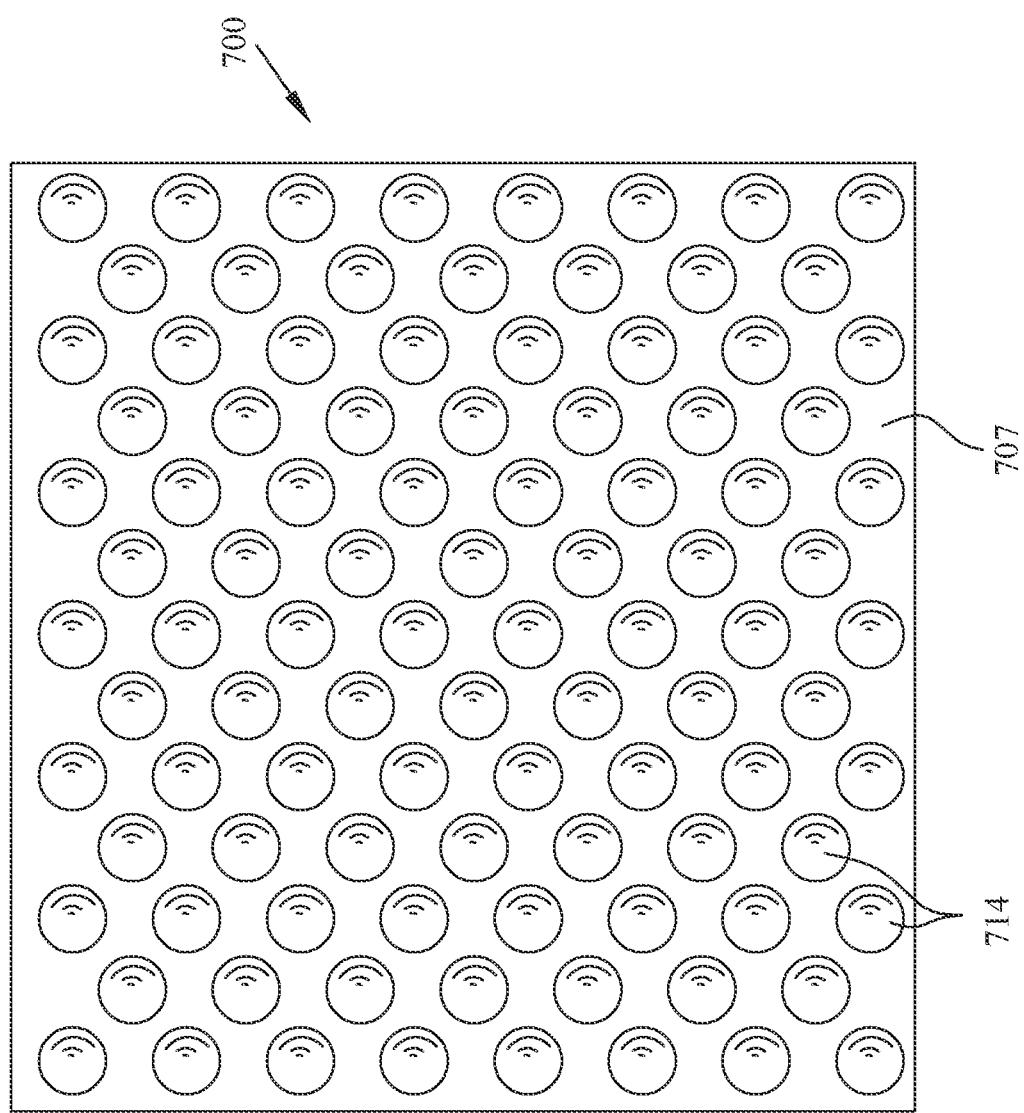
FIG. 33 is a perspective plan view of the vehicle frame and cargo bay liner of FIG. 31 showing the side with dimples and aluminum foil thereon.
Figure 34:
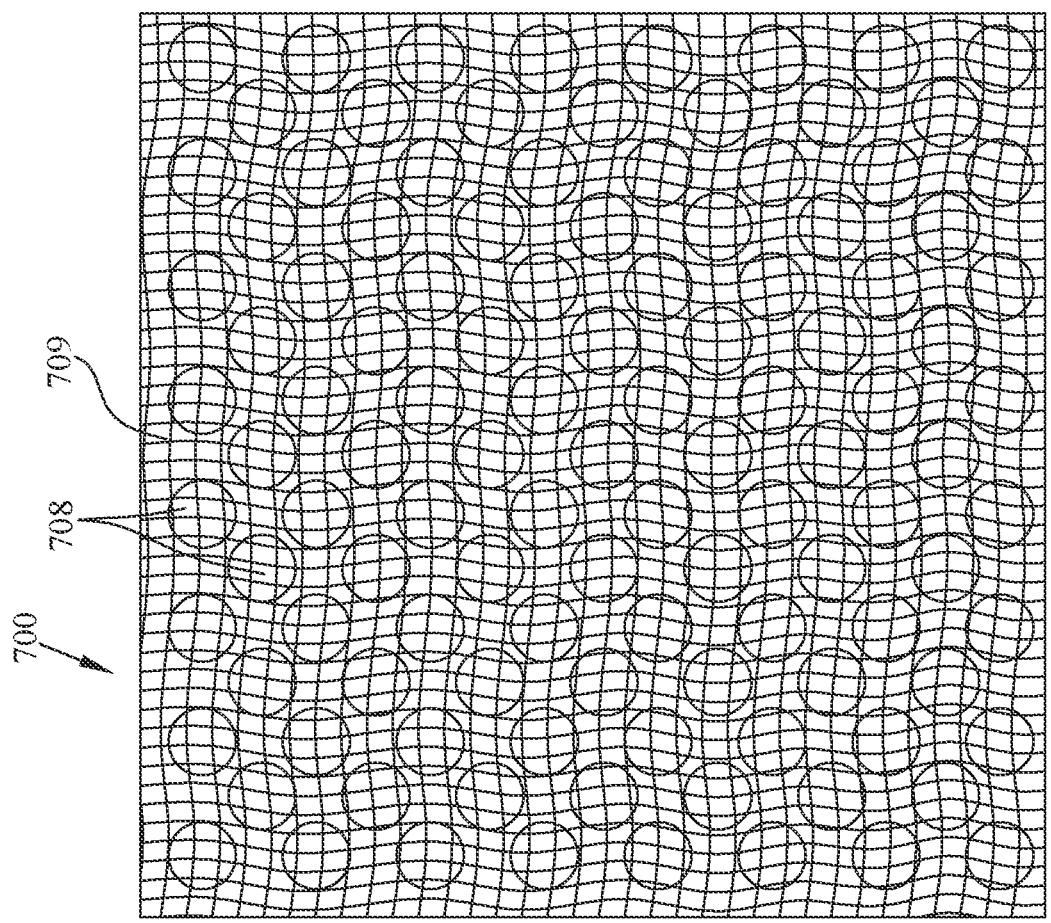
FIG. 34 is a perspective plan view of the vehicle frame and cargo bay liner of FIG. 31 showing a side with convexities and a woven material thereon.

In the embodiment shown, vehicle frame and cargo bay liner 700 also includes a plurality of circular convexities 708 on top sheet 702 and a corresponding plurality of circular dimples or depressions 714 in bottom sheet 704. Vehicle frame and cargo bay liner 700 also includes a plurality of cylindrical projections 710 extending up from bottom sheet 704 and attached to top sheet 702 (see FIG. 31). Projections 710 may be thermally bonded to top sheet 702 as well as to bottom sheet 704. As can be seen in FIG. 31, circular convexities 708 and circular depressions 714 coincide with cylindrical projections 710. Also, as should be appreciated, cylindrical projections 710 form the core of vehicle frame and cargo bay liner 700.

As discussed above regarding liner 400, projections 710 form an obstruction to passage through core 706 such that any water entering the ends thereof is obstructed and impeded or hindered from propagating across liner 700 as compared to channels 111 in corrugated liner 104, which readily allow transport of liquids. Additionally, as where vehicle frame and cargo bay liner 700 is cut, it will intersect a plurality of cylindrical projections 710 in the liner. As each cylinder is closed off, any water entering into an end of the liner where a projection has been cut will be prevented from further propagating by encountering the wall of the projection. Only a small area or channel between cylindrical projections would allow any water or moisture to enter into core 706 of liner 700, but that will not readily propagate to the offset projections internal to core 706 that will impede or hinder any advancement of the moisture.

Figure 38:
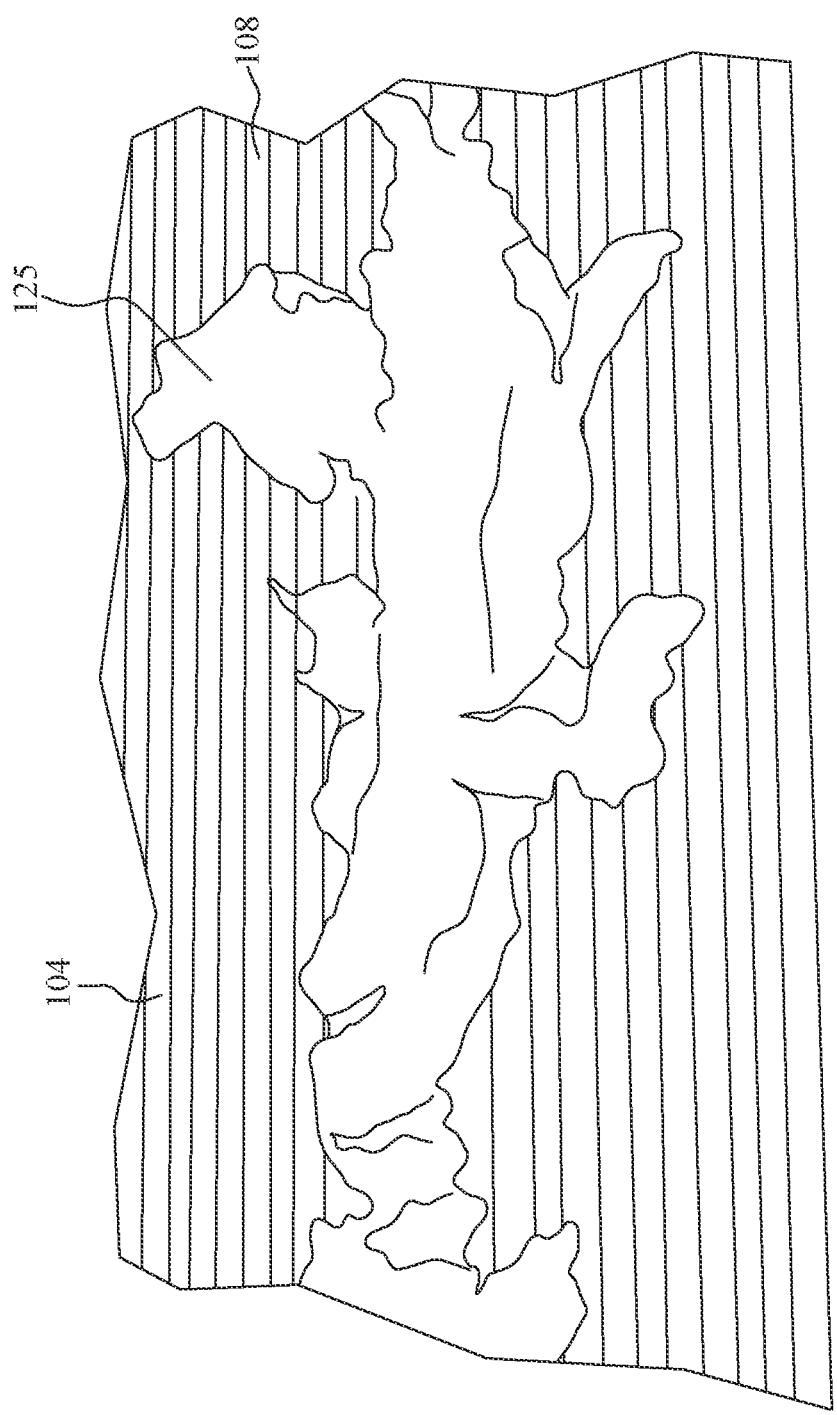
FIG. 38 is a plan perspective view showing a foam sealing material adhered to the bottom of a prior art liner.
Figure 39:
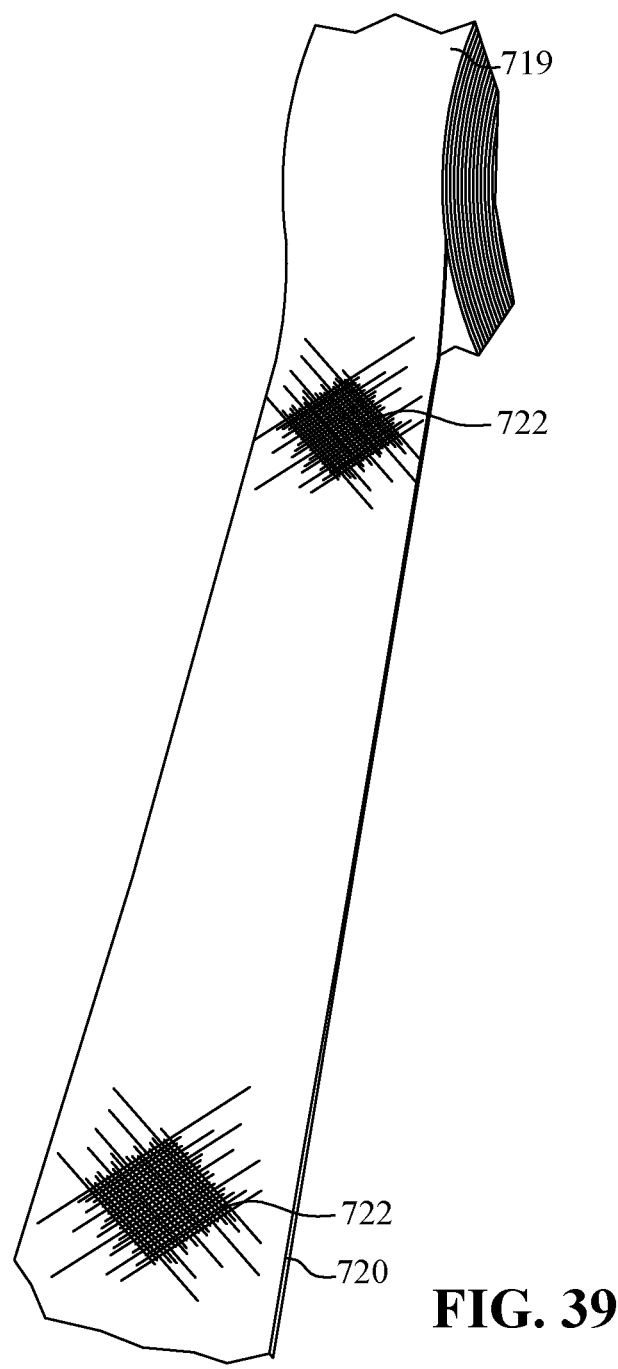
FIG. 39 is a perspective view of a role of repair tape for use in repairing the woven material.
Figure 40:
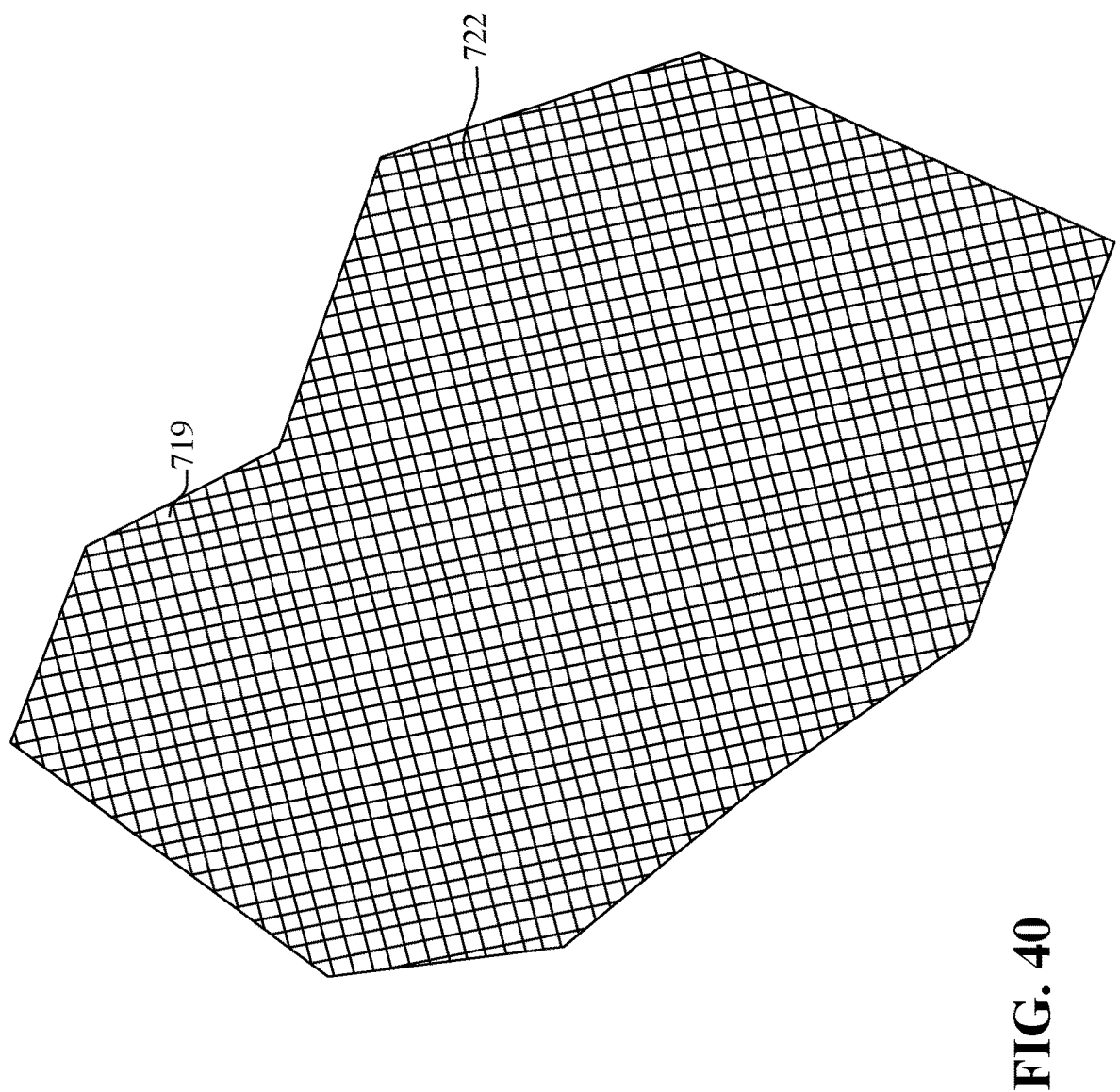
FIG. 40 is an enlarged plan view of the woven material repair tape.
Figure 41:
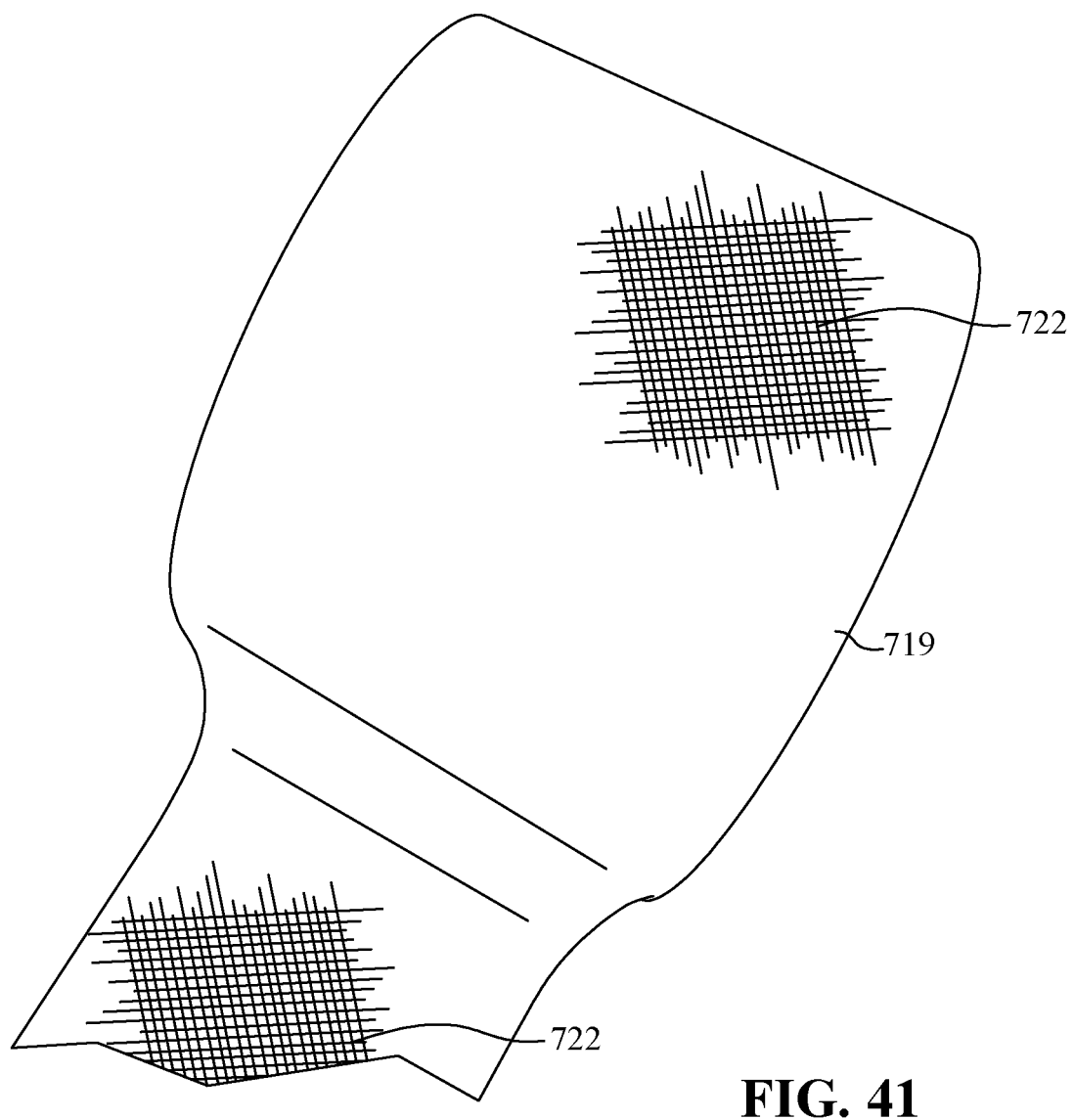
FIG. 41 is another plan view of the role of woven material repair tape.

When rolled out and installed on a frame 32 of a recreational vehicle, aluminum sheet or foil or metalized film 707 of liner 700 will preferably be disposed toward the living quarters of the recreational vehicle. Accordingly, the foil provides an additional insulation barrier between the ground and living quarters. Sheet of woven or nonwoven material 709 is preferably placed on the side of the liner facing the ground. Sheet of material 709 is particularly suited for receiving a spray foam sealing and insulation material 125 (see FIG. 38). The spray foam readily adheres to material 709, and a woven polypropylene material has been found to be very suitable. It should be noted that prior art corrugated liners 104 are typically manufactured from a polyethylene material, which is better at adhering the spray foam material 125 than the polypropylene liners disclosed in embodiments above. However, a woven layer of material 709 is better yet for adhering the spray foam sealing and insulation material. Note, the aluminum foil may be placed towards the ground of a recreational vehicle; however, any stones or debris kicking up may create tearing or holes therein and the foil will not readily adhere a spray foam material thereon.

Figure 35:
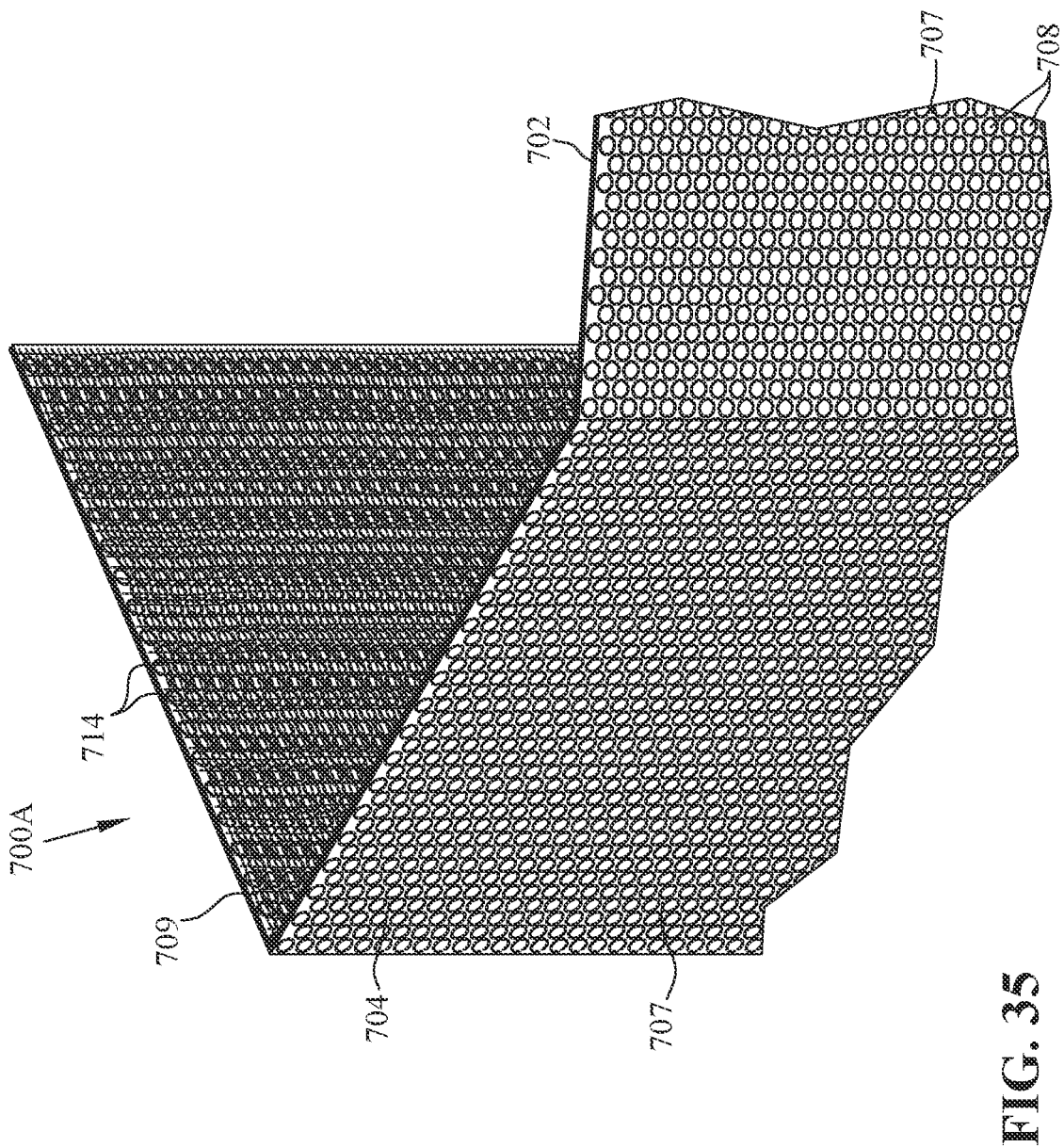
FIG. 35 is a perspective of a similar alternate embodiment view of a vehicle frame and cargo bay liner like FIG. 31, but with the aluminum foil on the side with convexities and a woven material on the opposite side with dimples.
Figure 36:
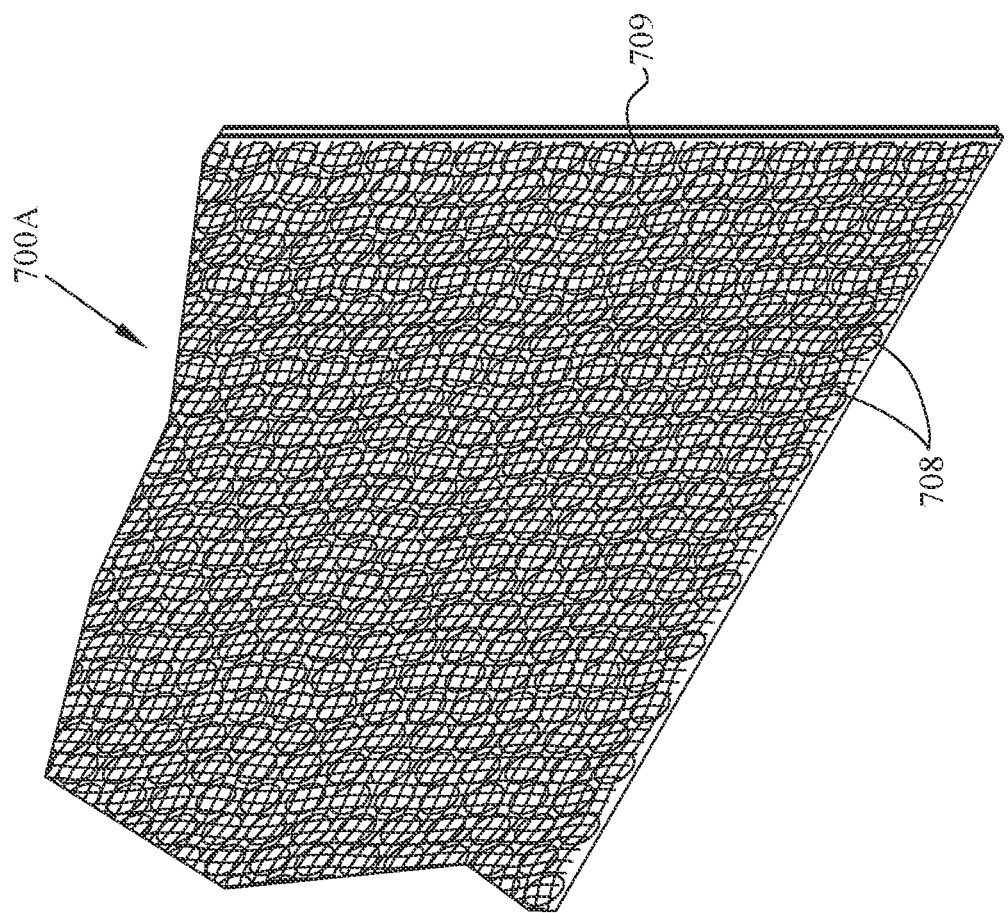
FIG. 36 is a plan perspective plan view of the vehicle frame and cargo bay liner of FIG. 35 showing the dimpled side having the woven material thereon.
Figure 37:
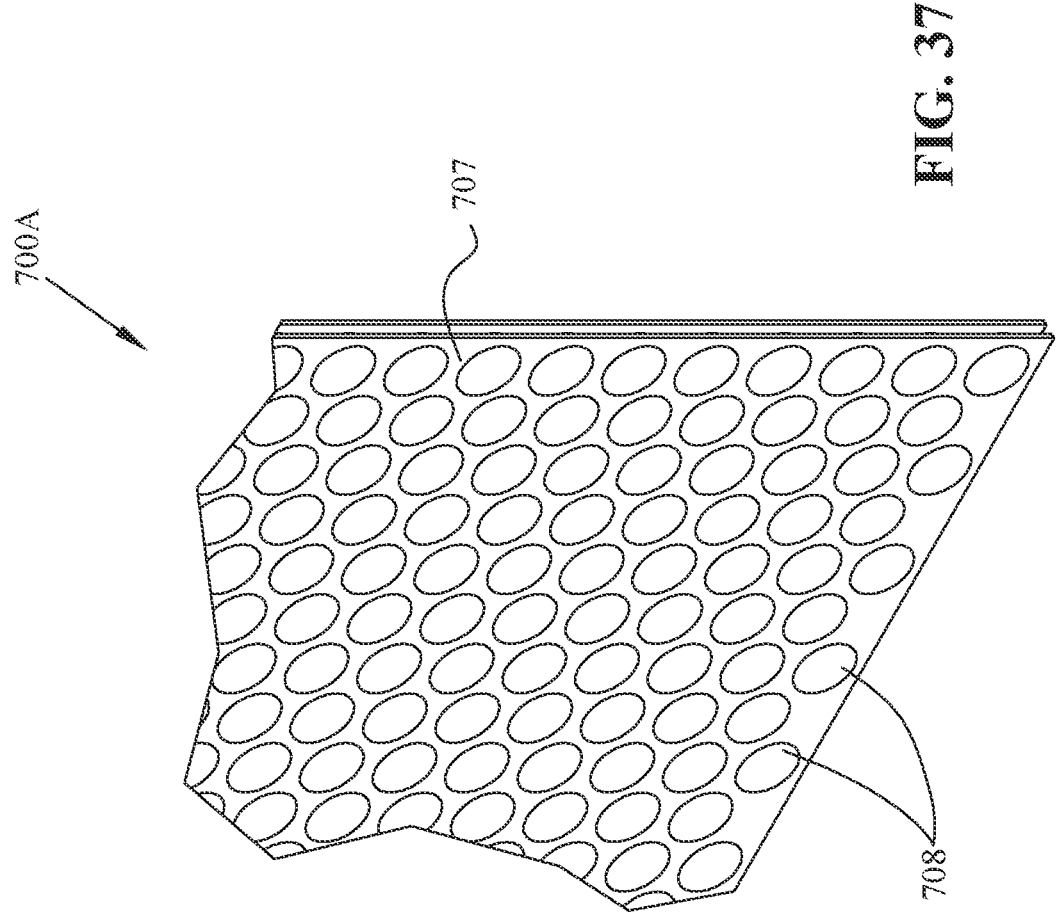
FIG. 37 is a plan perspective plan view of the vehicle frame and cargo bay liner of FIG. 35 showing the convex side having the aluminum foil thereon side.

In the embodiment of the 3 ply vehicle frame and cargo bay liner 700 of FIGS. 31-34, the aluminum foil or metalized film 707 is shown adhered to the side of liner 700 with dimples 714 and woven material 709 is shown adhered to the side with convexities 708; however, in FIGS. 35-37 an alternate embodiment vehicle frame and cargo bay liner, shown generally indicated as 700a, has the woven or non-woven sheet of material 709 adhered to the side of the liner having dimples 714 and the aluminum foil 707 adhered to the side of the liner having convexities 708. Any and all of the aluminum foil, metalized film, woven material, and non-woven material can be laminated to the liner 700. The lamination process can include an adhesive, heat, and/or pressure in the lamination process. Also, the vehicle frame and cargo bay liner may be manufactured with only a layer of woven or nonwoven sheet of fabric material and no aluminum foil or alternately with aluminum foil and no woven or nonwoven fabric. It should be appreciated that the lamination process securely attaches the foil, film and/or fabric firmly to the liner and helps keep the laminated layers in a strong sandwich configuration. This provides significant benefits for numerous things, such as for instance, preventing the foil layer from short circuiting with electric or electronic holes cut through the line as the foil will not slide or move on the liner. Alternately, it may be provided with either aluminum foil on both sides or with woven or non-woven fabric on both sides.

Now referring now to FIGS. 39-42, a unique repair and reinforcing system is provided for any of the liners provide herein and may be used to repair rips, tears or holes in the liner itself, or in the aluminum foil or metalized film or to provided additional support, reinforcement or protection to the liner. However, it is particularly suitable for repairing rips, tears, holes etc. in the woven or nonwoven fabric that may be attached to and covering one or both outer faces of the liner. Such rips, tears etc. may be through only the woven or nonwoven fabric, but also may be through partially or entirely through the body of the liner. Also, it may be necessary to cut through the liner to install plumbing, electrical lines etc. in the recreational vehicle. The repair system can be used to repair around such installations.

Figure 42:
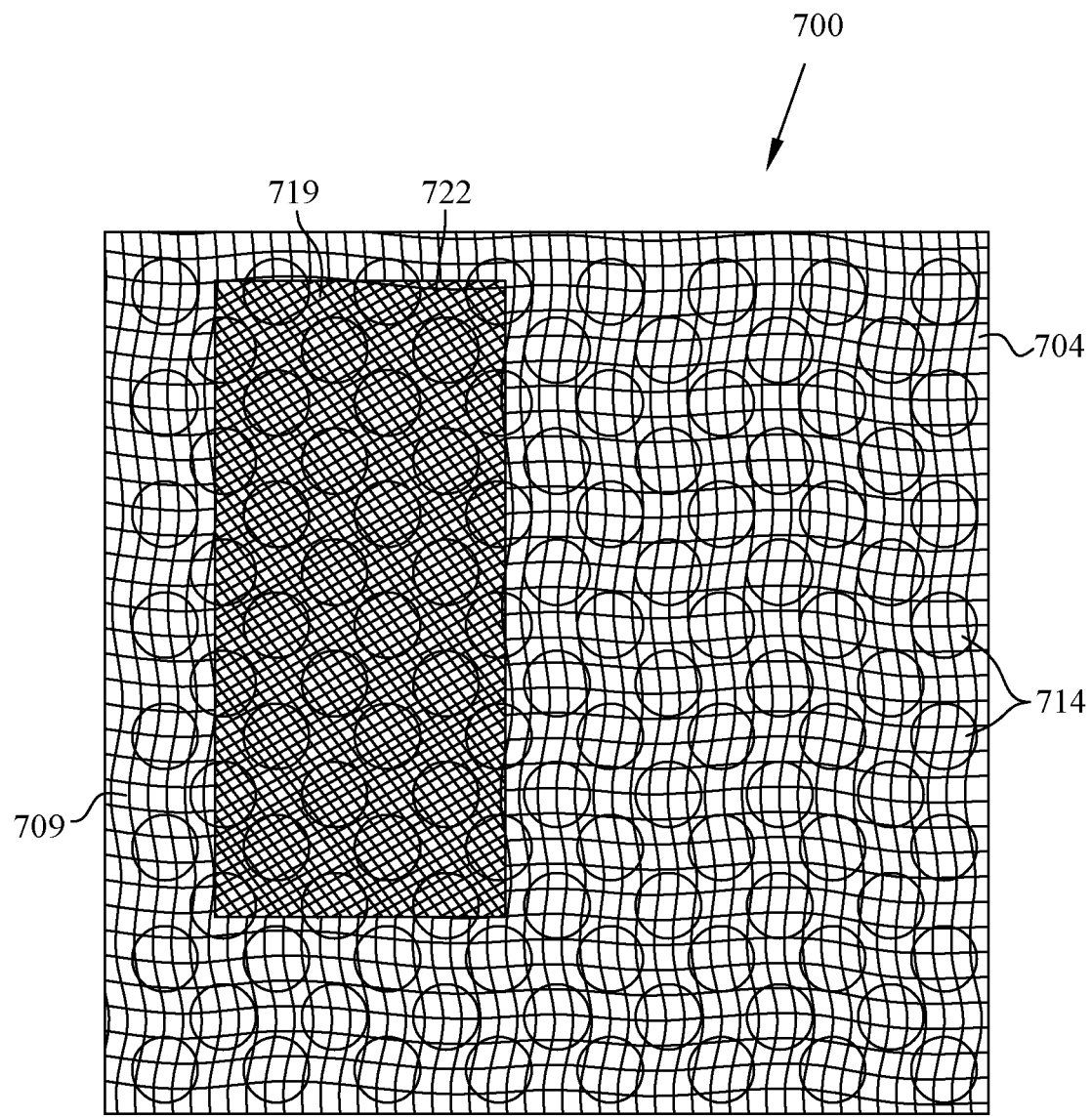
FIG. 42 is a plan view of a liner having a sheet of material with a woven fabric attached thereon and a piece of repair tape attached to the woven material.
Figure 43:
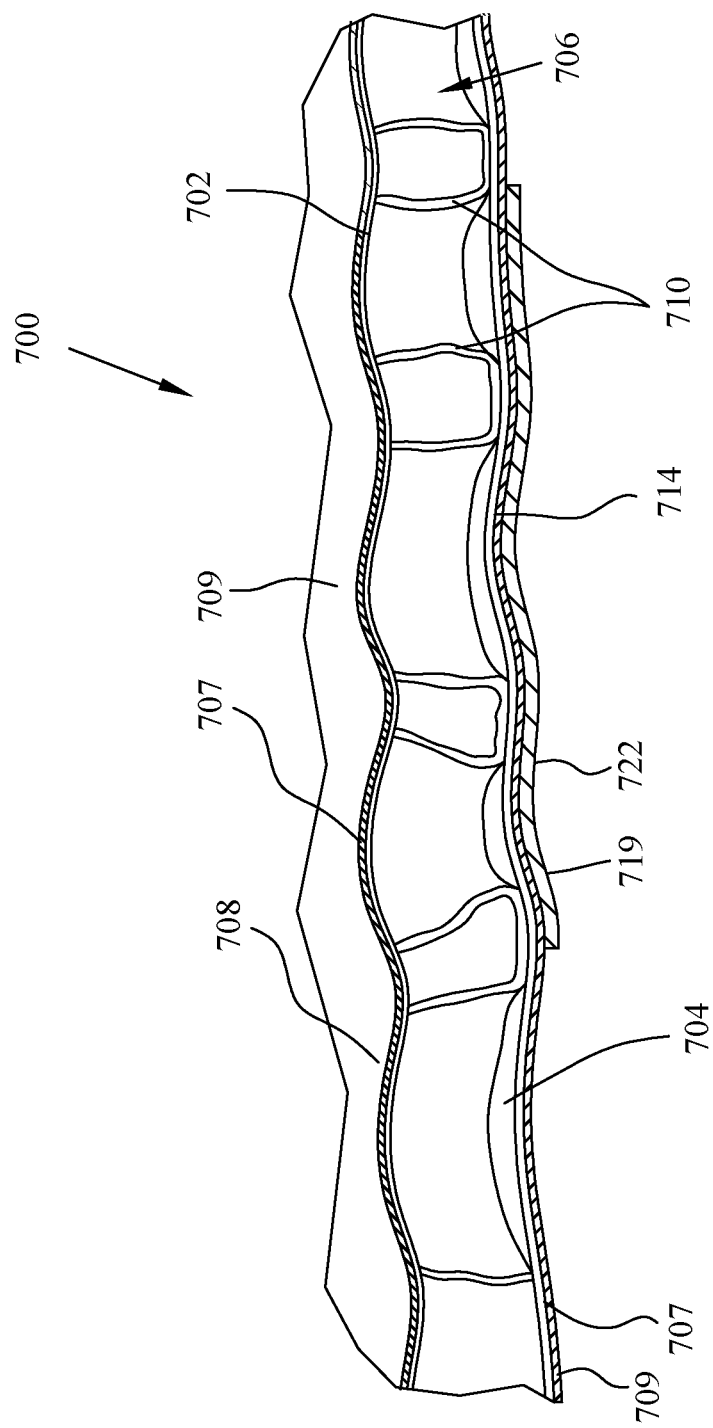
FIG. 43 is a cross sectional view of the liner of FIG. 42 taken through the piece of repair tape.

In one embodiment, the repair system includes a role of woven or nonwoven fabric tape shown indicated as 719. In the embodiment shown, the fabric tape includes a woven fabric shown as 722. Also, in the embodiment shown, the tape can be supplied with a contact adhesive attached to one side thereof for attachment to the liner, foil, film or fabric that it is repairing or reinforcing. A protective layer of material 720 (see FIG. 39) to which the adhesive will readily release from may be used to facilitate providing the repair tape in a rolled form or otherwise facilitate removing thereof for easy repair or reinforcement of the recreational vehicle. As shown in FIGS. 42 and 43, repair tape 719 is attached to woven fabric layer 709, on the exterior thereof, creating an additional layer to the liner 700 as is best shown in FIG. 43. It should be appreciated that repair and reinforcing tape 719 could be placed or attached over itself to create additional reinforcing layers, and/or on the other side of the liner over the sheet of aluminum foil or metalized file 707. As many additional layers as is desired can be placed on either or both sides. It should also be appreciated that the repair tape could be an aluminum foil, or metalized film or other polymer or material, but the woven fabric tape has shown to be particularly suitable.

Now referring to FIGS. 44-50, an alternate embodiment vehicle and cargo bay liner including an integral hatch opening is shown generally indicated as 800. Liner 800 is similar in most respects to liner 700. Liner 800 can be provided in a coiled form as liner 400, making it extremely suitable for use as a liner for vehicle frames and cargo bays. The desired length of liner can be rolled out and cut to size for assembly to the vehicle. Vehicle frame and cargo bay liner 800 is of a 3-ply configuration and includes a top ply, sheet, or layer 802 and a bottom ply, sheet, or layer 804. Top ply 802 and bottom play 804 are separated by a core similar to liner 700 having a core 706 (see FIG. 31). Additionally, vehicle frame and cargo bay liner 800 also includes a sheet of aluminum foil or metalized film 807 on one side thereof. In the embodiment shown, aluminum foil/metalized film 807 is provided on top ply 802; however, it should be appreciated that aluminum foil/metalized film could also be provided on the bottom ply 804. Aluminum foil/film 807 may be adhered to top ply 802 using an adhesive or other suitable means and/or laminated to top ply 802. Vehicle frame and cargo bay liner 800 also includes a woven or nonwoven layer of material 809 adhered to bottom ply 804, opposite the side with aluminum foil 807 or metalized film. In one embodiment, material 809 is a woven sheet of polypropylene fabric.

In the embodiment shown, vehicle frame and cargo bay liner 800 also includes a plurality of circular convexities 810 on top ply 802 and a corresponding plurality of circular dimples or depressions 814 in bottom ply 804. Vehicle frame and cargo bay liner 800 also includes a plurality of cylindrical projections extending up from bottom sheet 804 and attached to top sheet 802. The projections may be thermally bonded to top sheet 802 as well as to bottom sheet 804. Circular convexities 810 and circular depressions 814 coincide with the cylindrical projections as in liner 700. Also, as should be appreciated, the cylindrical projections form the core of vehicle frame and cargo bay liner 800.

Figure 45:
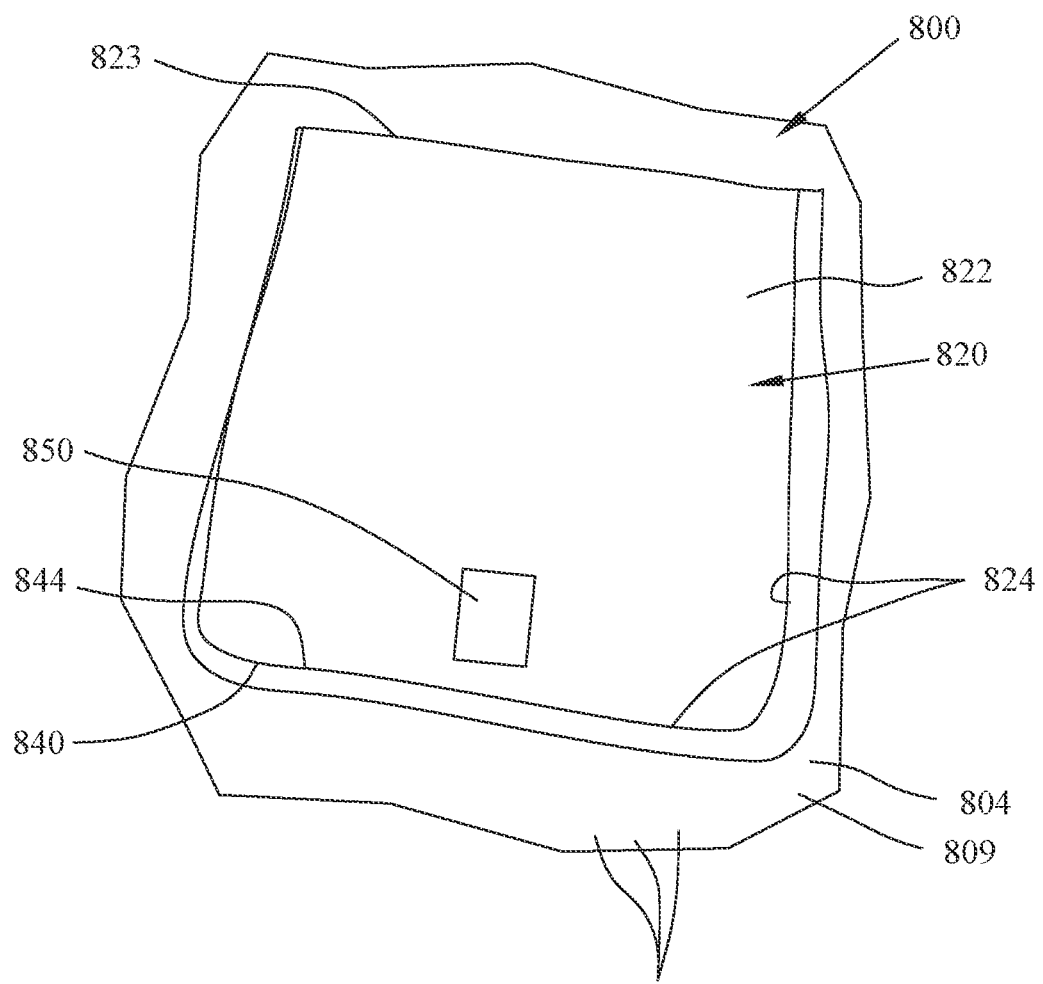
FIG. 45 is a bottom perspective view of the vehicle frame and cargo bay liner of FIG. 44 having an aluminum foil on one side and a woven material on the opposite side and further including a built in hatch to allow access to the underside of the vehicle, with the hatch in a closed position.
Figure 46:
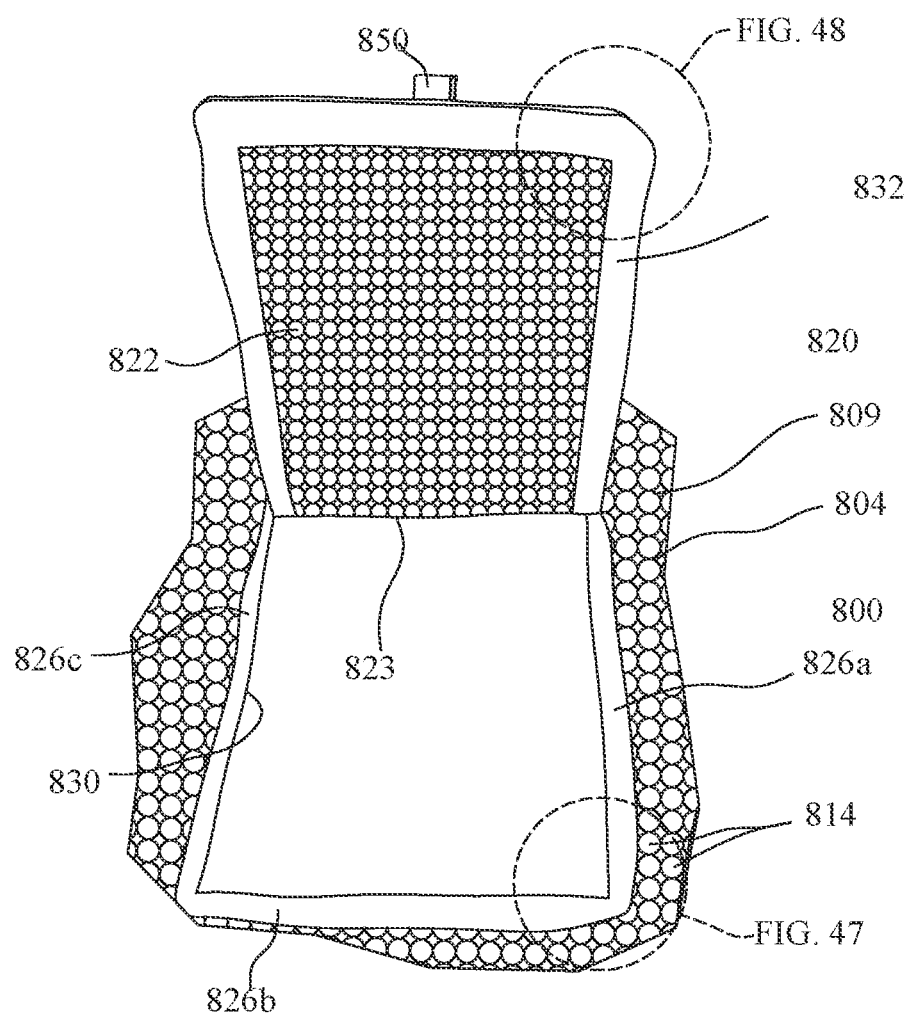
FIG. 46 is a bottom perspective view of the vehicle frame and cargo bay liner of FIG. 44 having an aluminum foil on one side and a woven material on the opposite side and further including a built in hatch to allow access to the underside of the vehicle, with the hatch in an open position.
Figure 47:
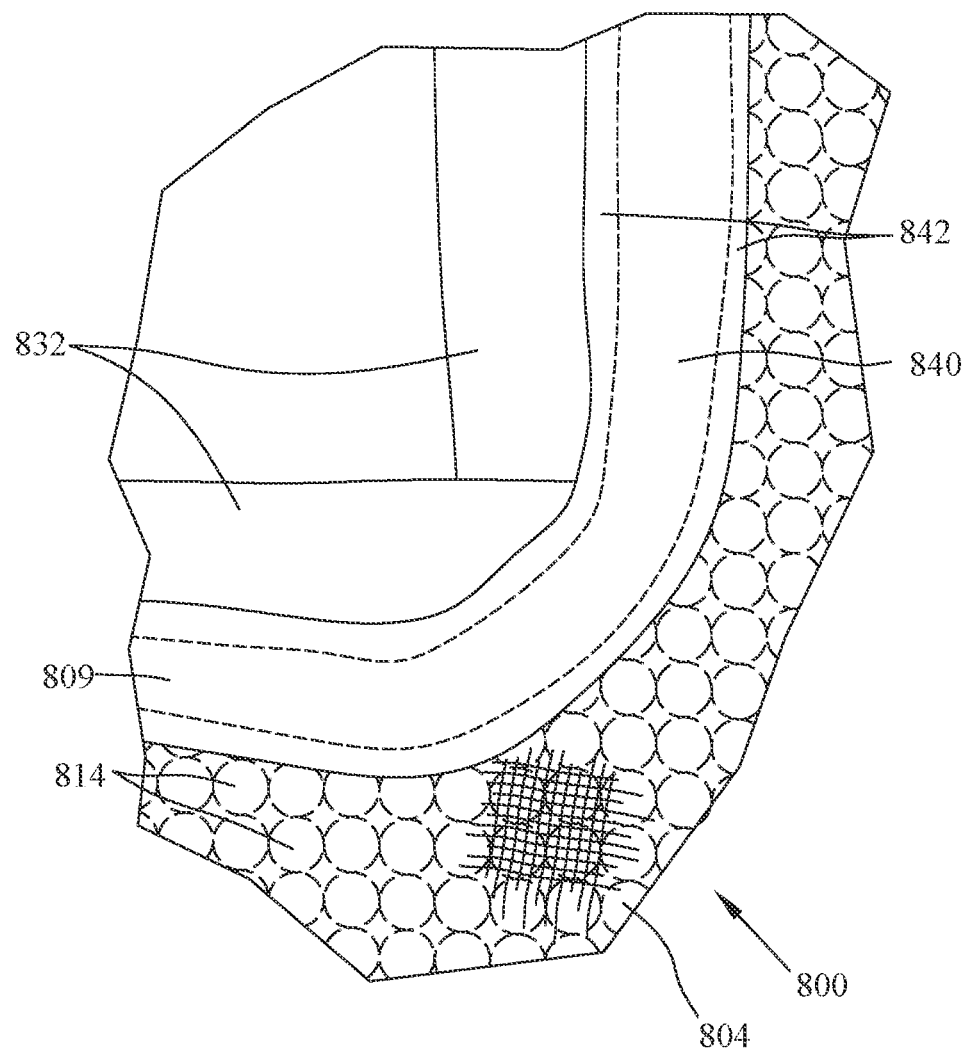
FIG. 47 is an enlarged bottom perspective view of the vehicle frame and cargo bay liner of FIG. 44 from the area indicated in FIG. 46.
Figure 48:
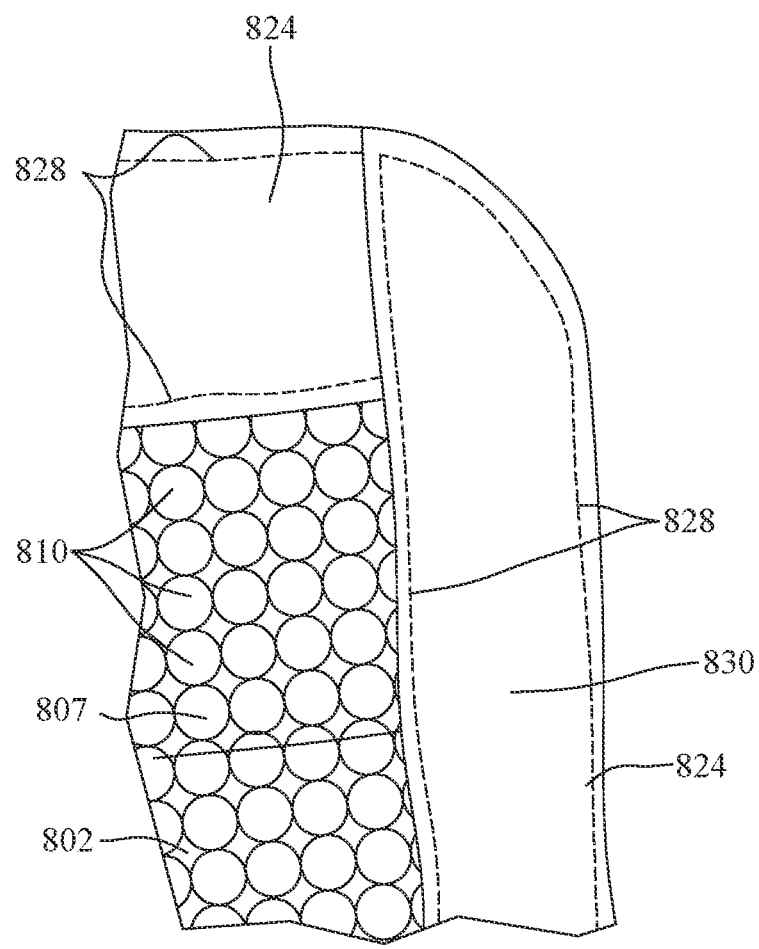
FIG. 48 is an enlarged bottom perspective view of the vehicle frame and cargo bay liner of FIG. 44 from the area indicated in FIG. 46.
Figure 49:
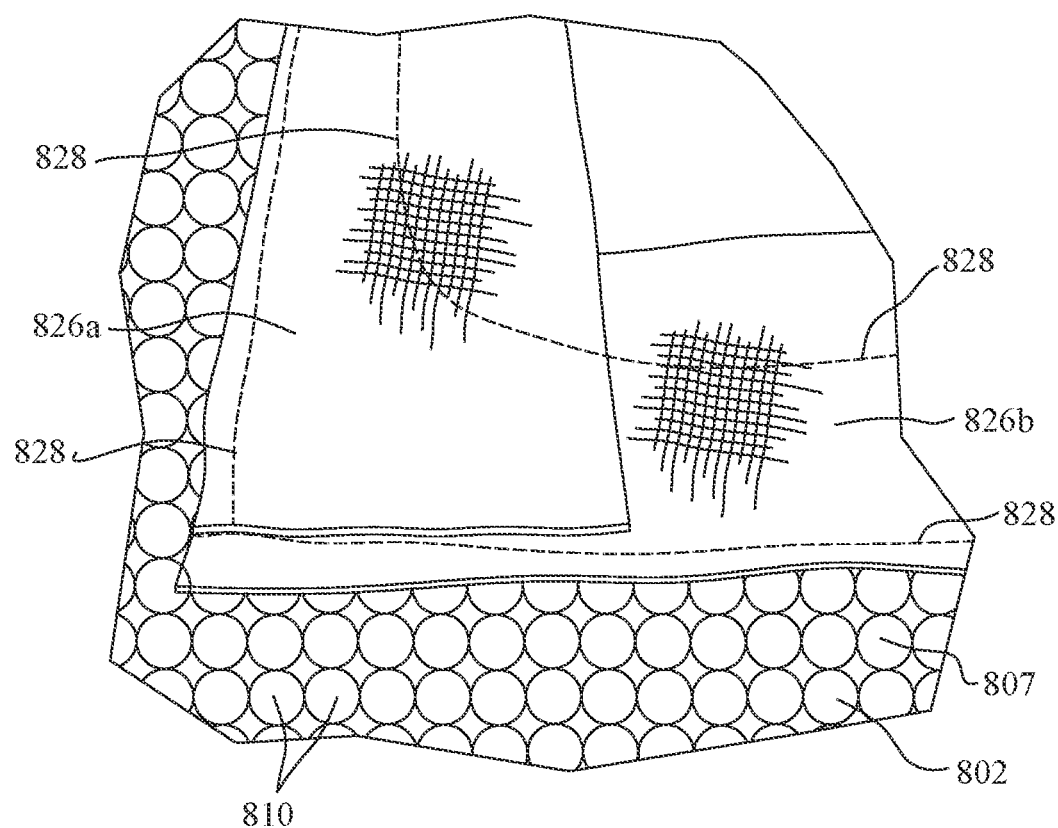
FIG. 49 is an enlarged top perspective view of the vehicle frame and cargo bay liner of FIG. 44 from the area indicated in FIG. 44.
Figure 50:
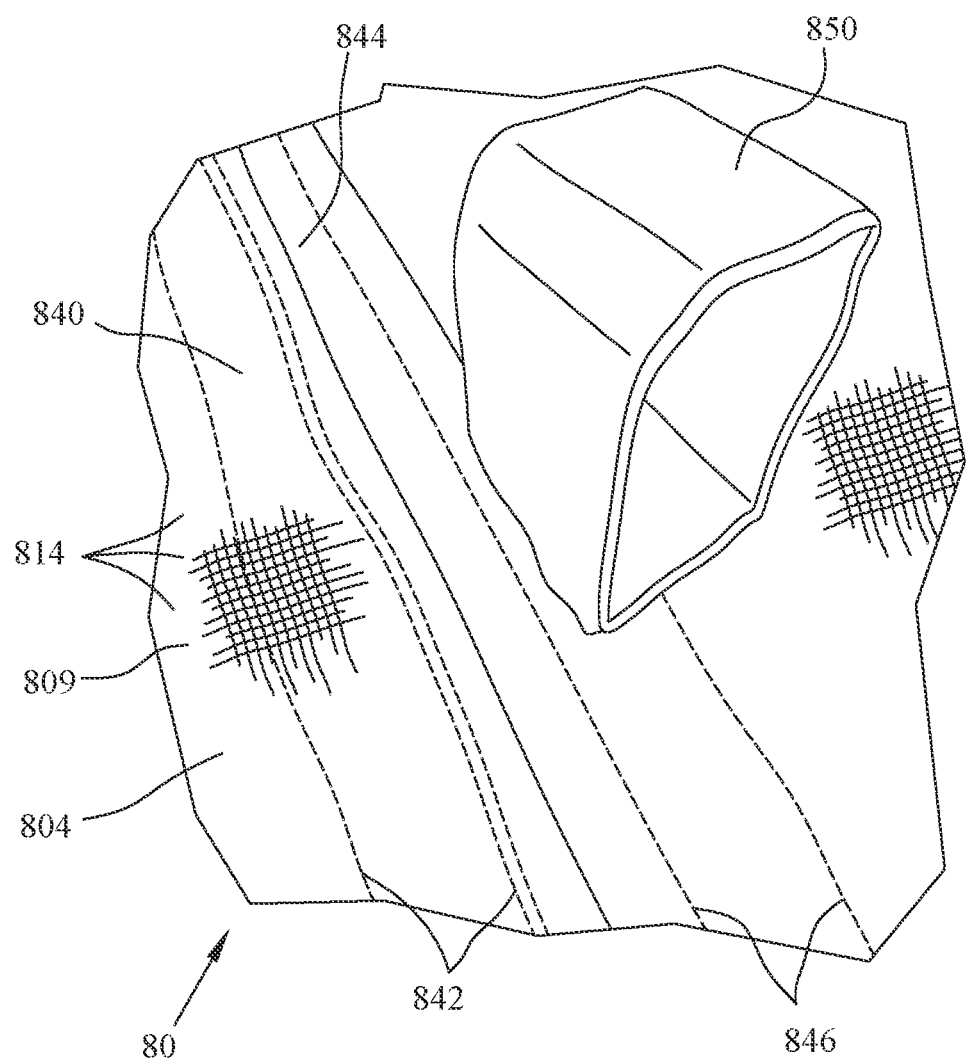
FIG. 50 is an enlarged bottom perspective view of a handle on the hatch of the vehicle frame and cargo bay liner of FIG. 44.

A unique aspect to liner 800 is that it also includes an integrally formed openable/closable hatch, generally indicated as 820. Hatch 820 is formed from liner 800 in the embodiment shown by having three slits or cuts made in liner 800 to form a movable flap 822. Movable flap 822 is attached along one side thereof to liner 800, the attachment area serving as a hinged connection 823 to liner 800. Detachable edges of flap 822 are indicated as 824 as best shown in FIGS. 45 and 46.

A reinforcing fabric 826 or other know types of reinforcement such as plastic is attached along the exterior edges of hatch 820 on top ply 802 using stiches 828 or other know attachment means including but not limited to adhesive, thermal attachments, snaps, and zippers. In the embodiment shown reinforcing fabric 826 protrudes beyond the edges of liner 800 into an opening of hatch 820 and includes a hook and loop fastening material 830 on a bottom side thereof. Of course, other known attachment mechanisms such as snaps and zippers may also be employed. Reinforcing fabric 826 can be provided in the separate lengths 826a,b, and c that may be overlapped with one another.

Figure 44:
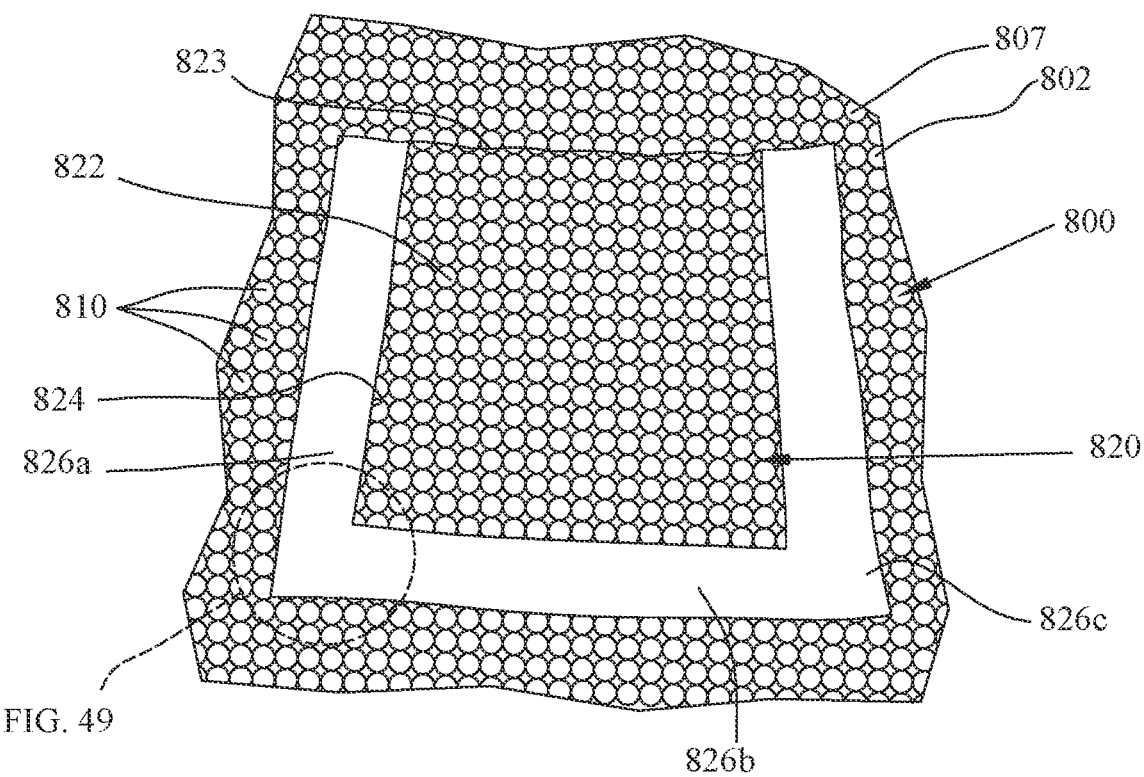
FIG. 44 is a top perspective view of another alternate embodiment vehicle frame and cargo bay liner having an aluminum foil on one side and a woven material on the opposite side and further including a built in hatch to allow access to the underside of the vehicle, with the hatch in a closed position.

Flap 822 has an opposing and matingly connectable hook and loop material connected on top ply 802 around edges of the flap 822. To be releasably attachable to the hook and loop fastening material 830 to facilitating holding flap 822 in a closed position as shown in FIGS. 44 and 45 or allowing the attachment to be released to open flap 822 and hatch 820 as shown in FIG. 46. Stitching 828 or other know attachment means is used to attach hook and loop fastening material 830 to flap 822.

Bottom ply 804 also has reinforcing edges 840 around the outer edges of hatch 820, which may be made from the same material as woven sheet 809. It may be single double or more layered and held and strengthened by stiches 842 or other known means. The embodiment shown also includes reinforcement 844 around bottom ply 804 edges of flap 822 as with reinforcement 840, reinforcement 844 may be made from the same material as woven sheet 809. It may be single double or more layered and held and strengthened by stiches 846 or other known means. A flexible handle 850 is attached to the bottom ply 804 of flap 822 by stitching or other known means also. It may utilize the same stitching 846 as used for reinforcement 844.

As should be appreciated by one skilled in the art, integral hatch 820 provides a very convenient means to access the underside of a vehicle to which liner 800 is attached. One or more hatches can be placed wherever desired, but will typically be placed where convenient to allow access to plumbing, electrical boxes or other areas frequently used to access the underside of the vehicle. Of course, more than one hatch 820 may be provided in liner 800 in any areas desired. Hatch 820 provides an easy secure means of providing access to the underside of the vehicle and is easily opened, but stays securely shut at other times as such while the vehicle is traveling.

While the invention has been taught with specific reference to these embodiments, one skilled in the art will recognize that changes can be made in form and detail without departing from the spirit and scope of the invention. For example, although the application shows a travel trailer and cargo trailer or toy hauler, it should be appreciated that the subject invention is also suitable for other types of vehicles, including but not limited to fifth wheel trailers, motor homes, park model trailers and mobile homes. Additionally, metalized film may be substituted for aluminum foil where called out, recognizing that Aluminum foil often provides a stronger more suitable alternative than metalized film. Additionally, although the hatch is shown as having a generally rectangular configuration, other configurations may used as desired, including but not limited to circular, oval, or triangular. Also, the hatch is shown in a generally rectangular configuration, but any suitable configuration, including but not limited to a semi-circular configuration, may be employed. This application is intended to cover any variations, uses, or adaptations of the invention using its general principles. Further, this application is intended to cover such departures from the present disclosure as has come within the known or customary practice in the art to which the invention pertains and which fall within the limits of the appended claims or equivalents thereof.

The invention claimed is:

1. A vehicle and liner assembly comprising:
   a recreational vehicle having a housing, a front end, a rear end, a top, a bottom, and a pair of sidewalls;
   a frame assembly, the housing mounted on and supported by the frame assembly;
   a liner attached to the frame assembly and covering at least a substantial portion of the bottom of the housing, the liner having a first ply having an outer face and an inner face, said inner face having a plurality of projections attached to and extending therefrom to an inner face on a second ply spaced apart and substantially parallel to said first ply, and said second ply also having an outer face, said projections also attached to said inner face on said second ply, and said projections forming a core of said liner, each projection forming a closed off encapsulated area; and
   a hatch located in the liner, the hatch allowing releasable and closable access to an underside of the recreational vehicle.

2. The vehicle and liner assembly as set for in claim 1, wherein the hatch is cut into the liner.

3. The vehicle and liner assembly as set for in claim 2, wherein the hatch is attached to the liner along a length of the hatch forming a flap of liner.

4. The vehicle and liner assembly as set for in claim 3, wherein the length of the hatch attached to the liner functions as a hinge for opening and closing the flap on the hatch.

5. The vehicle and liner assembly as set for in claim 4, wherein a reinforcing fabric is attached along the edges of the flap.

6. The vehicle and liner assembly as set for in claim 5, wherein the reinforcing material is attached using stiches.

7. The vehicle and liner assembly as set for in claim 5, wherein the reinforcing material is attached using an adhesive.

8. The vehicle and liner assembly as set for in claim 5, wherein the hatch includes a hook and loop fastening material along edges of the flap to releasably fasten the hatch to the liner.

9. The vehicle and liner assembly as set for in claim 8, wherein edges of the liner include connectable hook and loop fastening material to releasably connect the flap of the hatch to the liner.

10. The vehicle and liner assembly as set for in claim 9, wherein a bottom ply of the edges of the liner adjacent the hatch includes reinforcing edges.

11. The vehicle and liner assembly as set for in claim 1, wherein the hatch is integrally formed in said liner.

12. The vehicle and liner assembly as set for in claim 11, wherein said hatch includes a flap made by cutting the liner along edges of the flap and leaving a portion of the flap connected to the liner forming a connection area, said connection area functioning as a hinge to open and close the flap.

13. The vehicle and liner assembly as set for in claim 12, including reinforcement areas along edges of the hatch and flap, said reinforcing areas including a releasable attachment to open and close the flap on the hatch.

14. The vehicle and liner assembly as set for in claim 13, wherein the releasable attachment includes hook and loop fastening material.

15. A liner assembly configured to be mounted beneath and protect the underside of a vehicle, the liner assembly comprising:
   a liner configured to be attached to a frame assembly on a vehicle in order to cover at least a substantial portion of the bottom of the vehicle, the liner having a first ply having an outer face and an inner face and a plurality of projections extending from said inner face of said first ply, said inner face located on an opposite side of said first ply from said outer face, and a second ply spaced apart and substantially parallel to said first ply, said second ply having an outer face and an inner face, said inner face of said second ply facing said inner face of said first ply, said projections extending from said inner face of said first ply also attached to said inner face of said second ply, and said projections forming a core of said liner, each projection forming a closed off encapsulated area; and
   a hatch located in the liner, the hatch allowing releasable and closable access to an underside of a vehicle.

16. The liner assembly as set for in claim 15, wherein the hatch is cut into the liner.

17. The liner assembly as set for in claim 16, ply wherein the hatch is attached to the liner along a length of the hatch forming a flap of liner.

18. The liner assembly as set for in claim 16, wherein the length of the hatch attached to the liner functions as a hinge for opening and closing the flap on the hatch.

19. The liner assembly as set for in claim 18, wherein the hatch includes a hook and loop fastening material along edges of the flap to releasably fasten the hatch to the liner.

20. The liner assembly as set for in claim 19, wherein edges of the liner include connectable hook and loop fastening material to releasably connect the flap of the hatch to the liner.

\* \* \* \* \*